United States Patent
Iwasaki et al.

(10) Patent No.: US 7,224,876 B2
(45) Date of Patent: May 29, 2007

(54) SHEET LIGHT GUIDE AND COMMUNICATION SYSTEM USING THE SAME

(75) Inventors: Osamu Iwasaki, Fujinomiya (JP); Seiichi Watanabe, Odawara (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/044,078

(22) Filed: Jan. 28, 2005

(65) Prior Publication Data

US 2005/0163454 A1    Jul. 28, 2005

(30) Foreign Application Priority Data

Jan. 28, 2004    (JP) ............... 2004/019973

(51) Int. Cl.
*G02B 6/10* (2006.01)
*G02B 6/04* (2006.01)

(52) U.S. Cl. .............. 385/129; 385/121; 385/131
(58) Field of Classification Search ............. 385/146, 385/901, 129–132, 121
See application file for complete search history.

(56) References Cited

U.S. PATENT DOCUMENTS

| | | | |
|---|---|---|---|
| 5,542,017 A | 7/1996 | Koike | |
| 5,548,670 A | 8/1996 | Koike | |
| 5,580,932 A | 12/1996 | Koike | |
| 5,822,475 A * | 10/1998 | Hirota et al. | ............ 385/24 |
| 6,169,836 B1 * | 1/2001 | Sugiyama et al. | ......... 385/123 |
| 6,385,371 B1 * | 5/2002 | Li | ..................... 385/43 |
| 6,714,711 B1 * | 3/2004 | Lieberman et al. | ........ 385/124 |
| 2004/0071422 A1 * | 4/2004 | Aylward et al. | ........... 385/124 |
| 2005/0100282 A1 * | 5/2005 | Okada et al. | .............. 385/46 |

FOREIGN PATENT DOCUMENTS

| | | |
|---|---|---|
| EP | 1 213 594 A1 | 6/2002 |
| EP | 1 396 744 A2 | 3/2004 |
| EP | 1 441 247 A1 | 7/2004 |
| EP | 1 443 348 A2 | 8/2004 |
| JP | 11-31035 A | 2/1999 |

OTHER PUBLICATIONS

"High-Uniformity Star Coupler Using Diffused Light Transmission" IEICE Trans. Electron, vol. E84C, No. 3 Mar. 2001 p. 339.
Japanese Abstract No. 59091411, dated May 26, 1984.
Japanese Abstract No. 11031035, dated Feb. 2, 1999.
Japanese Abstract No. 2003114353, dated Apr. 18, 2003.

* cited by examiner

*Primary Examiner*—Michelle Connelly-Cushwa
*Assistant Examiner*—Rhonda S. Peace
(74) *Attorney, Agent, or Firm*—Sughrue Mion, PLLC

(57) ABSTRACT

In a communication system using a sheet light guide 100 which is formed by containing light-scattering particles in a sheet optical medium and propagates signal light incident from one end surface 100a to the other end surface 100a side while scattering the signal light by the particles, and using a plurality of optical fibers 21, 22, 23 and 24 or 31, 32, 33 and 34 coupled to the other end surface 100a in a state of being provided in parallel, each of the end surfaces 100a of the sheet light guide 100 is adapted to have an outer edge shape in which at least a part substantially coincides with an outer edge shape of the plurality of optical fibers 21 to 24 or 31 to 34.

9 Claims, 27 Drawing Sheets

FIG. 18
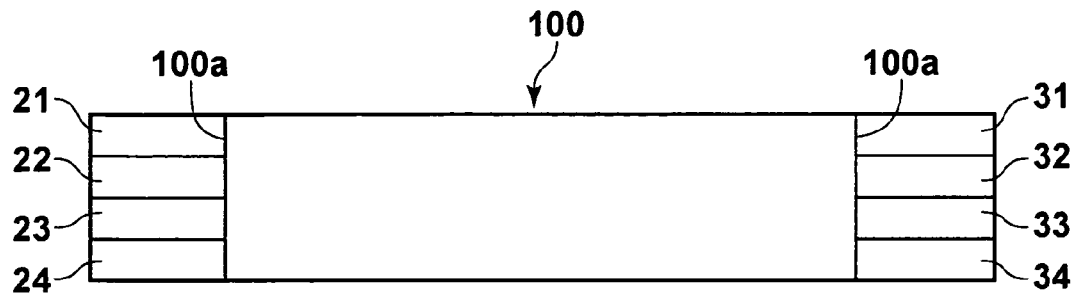
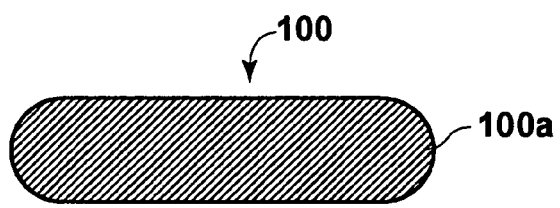
FIG. 19A
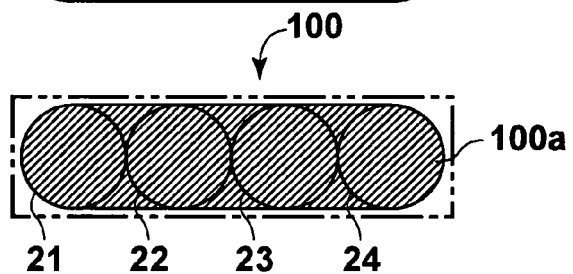
FIG. 19B
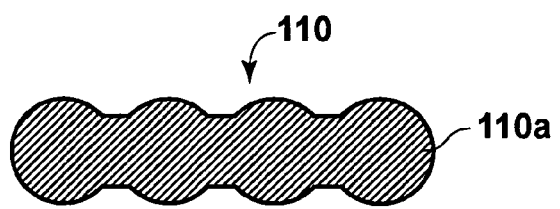
FIG. 20A
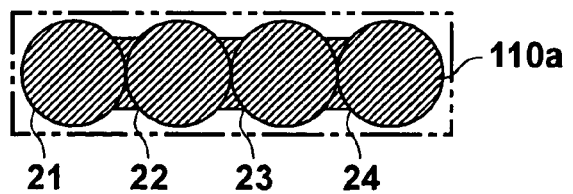
FIG. 20B

SHEET LIGHT GUIDE AND COMMUNICATION SYSTEM USING THE SAME

BACKGROUND OF THE INVENTION

1. Field of the Invention

The present invention relates to a communication system using a sheet light guide, and particularly, to a light guide which is formed by containing light-scattering particles in a sheet optical medium and propagates light incident from one end surface thereof to the other end surface side while scattering the light by the particles.

Moreover, the present invention relates to the sheet light guide for use in the communication system.

2. Description of the Related Art

Heretofore, for example, as described in U.S. Pat. Nos. 5,548,670 and 5,542,017, a light guide has been known, which is formed by containing light-scattering particles in an optical medium such as polymethylmethacrylate (PMMA), and propagates light incident from one end surface thereof to the other end surface side while scattering the light by the particles.

Such a light guide is that which propagates light while repeatedly scattering the light by the particles in the optical medium as well as by means of the mechanism of total reflection at an interface between the surface along the light guide and a surrounding medium (air or cladding layer). Accordingly, in comparison with a light guide which propagates the light only by the mechanism of the total reflection, the light guide thus described has an advantage in that light having an intensity which is more uniform can be taken out at an end surface where light is emitted. For example, as described in U.S. Pat. No. 5,822,475, it is conceived, by utilizing this advantage, to apply such a type of light guide to the purpose of constituting an optical data bus (sheet bus). The optical data bus is that which is formed by use of a sheet optical medium, and in which one input unit for inputting an optical signal is coupled to one end surface thereof, and a plurality of output units are coupled to the other end surface, thus distributing the inputted optical signal as a common signal to the plurality of output units.

Moreover, for example, as described in Japanese Unexamined Patent Publication No. 11 (1999)-031035, as such an optical data bus, one has been also known, in which light-scattering portions are provided on a light-incident-side end portion of the sheet optical medium so as to correspond to respective signal light incident portions, and signal light scattered and branched by the light-scattering portions is propagated toward a light-emitting-side end portion of the optical medium.

The sheet light guide formed by containing the light-scattering particles in the sheet optical medium, which is described in U.S. Pat. No. 5,822,475, is also frequently used by connecting a plurality of optical fibers provided in parallel to the one and the other end surfaces in order to constitute a plurality of nodes.

SUMMARY OF THE INVENTION

It is an object of the present invention to enhance coupling efficiency of the sheet light guide and the optical fibers in a communication system that uses a sheet light guide coupled to a plurality of optical fibers.

Moreover, it is another object of the present invention to provide a sheet light guide which enables the enhancement of the coupling efficiency.

A sheet light guide according to the present invention is:

a sheet light guide, which is formed by containing light-scattering particles in a sheet optical medium and propagates signal light incident from one end surface thereof to the other end surface side while scattering the signal light by the particles, and which is for use in a communication system using a plurality of optical fibers coupled to the other end surface in a state of being provided in parallel, wherein the other end surface emitting the signal light therefrom has an outer edge shape in which at least a part substantially coincides with an outer edge shape of the plurality of optical fibers.

More specifically, it is desirable that the other end surface of the sheet light guide have a side edge shape which substantially coincides with an outer edge shape of outer halves of the two outermost optical fibers among the plurality of optical fibers provided in parallel each being disposed in line. Moreover, it is desirable that the other end surface of the sheet light guide have upper and lower edge shapes, both edges being precut so that the shapes thereof substantially coincide with an outer edge shape of inner haves of two optical fibers adjacent to each other among the plurality of optical fibers provided in parallel each being disposed in line.

Moreover, it is preferable that, in the sheet light guide according to the present invention, a cross-sectional shape thereof be formed to be the same as the shape of the other end surface over the entire length of the light guide.

Meanwhile, a communication system using the sheet light guide according to the present invention is:

a communication system using a sheet light guide which is formed by containing light-scattering particles in a sheet optical medium and propagates signal light incident from one end surface thereof to the other end surface side while scattering the signal light by the particles, and using a plurality of optical fibers coupled to the other end surface in a state of being provided in parallel, wherein the sheet light guide according to the present invention is used as the sheet light guide.

Note that, in the communication system using the sheet light guide according to the present invention, it is desirable that, when a scattering cross sectional area of the particles is $\Phi$, a length of the optical medium in a light propagation direction is $L_G$, a particle density is Np, and a correction coefficient is $K_C$, a value of $\Phi \cdot Np \cdot L_G \cdot K_C$ be 0.9 or less.

Moreover, in the communication system using the sheet light guide according to the present invention, it is desirable that, when root mean square (rms) noise of the system is Noise(System_rms), an acceptable bit error rate is BER(accept), and a probability of occurrence of the Noise(System_rms) is Pr(Noise(System_rms)), the following equation is satisfied:

$$Pr(\text{Noise(System\_rms)} \cdot Q) \leq \text{BER(accept)}$$

where Q is a proportionality constant.

Furthermore, in the communication system using the sheet light guide according to the present invention, it is desirable that, when rms noise of the system is Noise(System_rms), an arbitrary threshold value in binarization is V(Thresh), and a signal voltage outputted from a photodetector through a load resistor is S(PRmin)v, the following relationship is established:

$$\{S(PR\min)v - V(\text{Thresh})\} > \text{Noise(System\_rms)} \cdot Q$$

where Q is a proportionality constant.

Moreover, when it is assumed that, in the sheet light guide for use in the present invention, light incident thereonto repeats reflection on respective surfaces other than incident/emitting end surfaces obeying Snell's Law, and when a refractive index of a peripheral medium is Ns, a refractive index of the optical medium as a mother material is Nm, an incident angle is θm, and a refraction angle is θs, if Nm·sin θm=Ns·sin θs is established in the case where the particles are not contained, it is desirable that the sheet light guide be formed of an optical medium of a shape satisfying sin θs>1.

Moreover, when it is assumed that, in the sheet light guide, a light beam emitted from at least one emitting end surface obeys Snell's Law in reflection/refraction thereof on the emitting end surface, and when a refractive index of a peripheral medium is Ns, a refractive index of the optical medium serving as a mother material is Nm, an incident angle is θm, and a refraction angle is θs, if Nm·sin θm=Ns·sin θs is established in the case where the particles are not contained, it is desirable that the sheet light guide be formed of an optical medium of a shape satisfying sin θs<1.

Moreover, in the sheet light guide for use in the present invention, the particles mixed into the optical medium may be non-magnetic conductive particles following the Mie scattering theory. Moreover, the particles may be mixed into the optical medium in such a manner that a gradient is given to a particle density thereof.

Furthermore, it is also possible to form the sheet light guide by combining a plurality of the optical mediums.

As for the sheet light guide according to the present invention, the other end surface emitting the signal light therefrom has the outer edge shape in which at least a part substantially coincides with the outer edge shape of the plurality of optical fibers. Accordingly, the sheet light guide becomes one which reduces leakage occurring when the signal light emitted from the outer edge enters the plurality of optical fibers. Accordingly, in the communication system of the present invention, which uses the sheet light guide and the plurality of optical fibers by coupling both thereof to each other, light transmission efficiency from the sheet light guide to the optical fibers can be enhanced sufficiently.

Note that, in U.S. Pat. Nos. 5,548,670 and 5,542,017 described above, there is proposed a light guide path for realizing a desired light intensity distribution by a structure in which a refractive index is not uniform or by mixing/diffusing dielectric particles in the optical medium. Moreover, U.S. Pat. Nos. 5,548,670 and 5,542,017 discloses that an application of the turbidity theory due to Debye (Journal of Applied Physics Vol. 20 pp. 518 to 525 (1949)) makes it possible to increase the intensity of the scattering light, and to realize uniformity of the light intensity distribution at an emitting port. In "Theory on Thermal Fluctuations of Dielectric Constant in Gas or Liquid" (Annalen Der Physik 33 pp. 1275–1298 (1910) developed by Einstein, Debye refers particularly to a consideration regarding the scattering light. An equation given by Einstein in the above-described paper is as follows:

$$i/Io=(RT/N)\cdot[(\epsilon-1)^2(\epsilon+2)^2/P]\cdot(2\pi/\lambda)^4[V/(4\pi D)^2]\cos^2\theta \quad (1)$$

where i: light intensity at position apart from scattering element by distance D
Io: intensity of incident light
R: gas constant
T: absolute temperature
N: molecularity of molecules of 1 g
ε: square of refractive index for wavelength λ(dielectric constant)
P: pressure applied to fluid
λ: wavelength
V: volume of light-scattering element
D: distance from light-scattering element to observation point
θ: scattering angle The above-described equation is transformed by Debye, and represented in the following expression:

$$i/I=<\eta>^2/\epsilon^2(\pi^2V/\lambda^4R^2)\cdot(1+\cos^2\theta)/2\cdot\omega \quad (2)$$

where i: light intensity at position apart from scattering element by distance D
Io: intensity of incident light
ε: dielectric constant of scattering element
$<\eta>^2$: mean square value of fluctuations of dielectric constant of scattering element
R: distance from observation point to scattering element
λ: wavelength
V: total volume of light-scattering element
θ: scattering angle
ω: correlation volume Moreover, the following is established:

$$\omega=4\pi\int\sin(ksr)/ksr/r^2\gamma(r)dr \quad (3)$$

where k: number of waves
s: length of resultant vector of unit vector of incident light and unit vector of emitted light
r: distance between two points where fluctuations of dielectric constant are occurring s is equal to 2sin(θ/2).

According to Debye, the correlation volume ω is integrable when the correlation function γ(r) is put as follows:

$$\gamma(r)=\exp(-r/a) \ (a: \text{correlation distance})$$

Accordingly, equation (3) can be represented as:

$$\omega=8\pi a^3/(1+k^2s^2a^2)^2 \quad (4)$$

From the equations (2) and (4), the following equation is established:

$$i/I=<\eta>^2/\epsilon^2(\pi^2V/\lambda^4R^2)\cdot(1+\cos^2\theta)/2\cdot 8\pi a^3/(1+k^2s^2a^2)^2$$

Here, by use of s=2 sin(θ/2), equation (2) is transformed as follows:

$$i/I=4\pi a^3<\eta>^2/\epsilon^2(\pi^2V/\lambda^4R^2)\cdot(1+\cos^2\theta)/(1+8\pi^2(1-\cos^2\theta)(a/\lambda)^2)^2 \quad (5)$$

The term for the intensity of the scattering angle in equation (4) is represented as follows:

$$f(\theta)=(1+\cos^2\theta)/(1+8\pi^2(1-\cos\theta)(a/\lambda)^2)^2 \quad (6)$$

FIG. 1 shows results of calculating this equation (6) for each typical value on (a/λ) and obtaining the scattering angles versus normalized intensities. Moreover, FIG. 2 shows results of obtaining the scattering angles versus the normalization intensities for each typical value on particle diameter Dp based on the Mie scattering theory.

According to U.S. Pat. Nos. 5,548,670 and 5,542,017, the particle diameter can be conceived to be substantially equal to the correlation distance. Accordingly, it is understood from FIG. 1 that, although intensity of forward-scattering light is increased when the particle diameter is substantially equal in size to the wavelength, intensity of sideward-scattering light is increased to a great degree when the particle diameter exceeds ten times the wavelength, and that the light no longer travels forward. Meanwhile, according to the Mie scattering theory, as apparent from FIG. 2, the intensity of the forward-scattering light is still intense even if the particle diameter exceeds ten times the wavelength. It is understood that, in the turbidity theory due to Debye, in the case where approximation is performed using $\gamma(r)=\exp(-r/a)$, the results obtained become close to those obtained for the Mie scattering when the particle diameter is substantially equal to the wavelength. However, the results largely differ from those obtained based on the Mie scattering theory for the particle diameters larger than that of the wavelength.

From the above consideration, the Mie scattering theory is conceived to be more suitable as a calculation method for emitting an incident light with a uniform intensity distribution, when the particles causing the light scattering are mixed into a desired optical medium. The Mie scattering theory shows Rayleigh scattering when the size of the particles is smaller than the wavelength by a great degree, and shows Huygens-Fresnel diffraction when the size of the particles is larger than the wavelength by a great degree. Furthermore, the Mie scattering theory is for a single-particle system, and an analysis by means of a multi-particle system based on the Mie scattering theory is conceived to be necessary for scattering of multi-particles.

In manufacture of the sheet light guide for use in the present invention, designing conditions to realize desired efficiency of taking out light can be easily obtained based on the above consideration. A method for the obtainment is described below in detail.

<Scattering Cross Section>

First, a scattering cross section $\Phi$ is described. Not only in the Mie scattering theory but also in a radiation range of the $\gamma$-ray, the X-ray and the like, and a long wavelength range of the microwave and the like other than light in the visible light range, a concept called the scattering cross section is widely used. When the relationship between the particle diameter and the wavelength is within the Rayleigh range, the scattering cross section $\Phi$ is represented as:

$$\Phi = 128 \cdot \pi^5 \cdot (a_p^6/3\lambda^4) \cdot \{(n^2-1)/(n^2+2)\}^2 \quad (7)$$

where $a_p$: particle radius
$\lambda$: wavelength of incident light
n: relative refractive index Meanwhile, in the theory of Mie, the scattering cross section $\Phi$ is represented by the following equation (8):

[Expression 1]

$$\Phi = (\lambda^2/2\pi) \sum_{n=1}^{\infty} (2n+1) \cdot [|a_n|^2 + |b_n|^2] \quad (8)$$

where $\lambda$: wavelength of incident light $$a_n = \frac{\varphi n(\alpha) \cdot \varphi'n(\beta) - N \cdot \varphi n(\beta) \cdot \varphi'n(\alpha)}{\zeta n(\alpha) \cdot \varphi'n(\beta) - N \cdot \varphi n(\beta) \cdot \zeta'n(\alpha)}$$

$$bn = \frac{N \cdot \varphi n(\alpha) \cdot \varphi'n(\beta) - \varphi n(\beta) \cdot \varphi'n(\alpha)}{N \cdot \zeta n(\alpha) \cdot \varphi'n(\beta) - \varphi n(\beta) \cdot \zeta'n(\alpha)}$$

$$\varphi n(kr) = (\pi kr/2) \cdot Jn+1/2(kr)$$

Jn+1/2 (kr): Bessel function of the first kind
k: number of waves($2\pi/\lambda$)

r: distance component in polar coordinates $\phi$n': derivative of $\phi$n $$\zeta n(kr) = \phi n(kr) + i \cdot \chi n(kr)$$

$$\chi n(kr) = -(\pi kr/2) \cdot Nn+1/2(kr)$$

Nn+1/2(kr): Bessel function of the second kind (Neumann function)
$\zeta$n': derivative of $\zeta$n $\alpha = 2\pi a/\lambda$ $\beta = N \cdot \alpha$ In a limit of $a/\lambda \gg 1$ of the above-described equation (8), the scattering cross section $\Phi$ is represented as:

$$\Phi = M\pi a_p^2 \text{ (when converging: } M \approx 2) \quad (9)$$

Moreover, it is already understood from the equation (8) that the above-described M oscillates in a range of: $1 < M < 6$ in a region of $2\pi a_p/\lambda \approx 1$.

Here, the states of oscillations of M where the relative refractive index n is 1.1, 1.5 and 2.1 are shown in FIGS. 3A, 3B and 3C, respectively. From these graphs, it is understood that the scattering cross section $\Phi$ in the Mie scattering region comes to oscillate/converge owing to an increase of the particle diameter Dn. In this oscillation region also, it is possible to obtain, in a wide range where the relative refractive index n is approximately 1 to 2, a numeric value to be multiplied to the geometric scattering cross section $\pi a_p^2$ in which the Mie scattering region converges, in response to the respective particle diameters from FIGS. 3A to 3C.

Results of obtaining the relationship between the particle diameter Dp and the scattering cross section $\Phi$ based on the above-described expressions (7) and (9) for each of some refractive indices n are shown in FIG. 4. Meanwhile, results of obtaining the relationship between the particle diameter Dp of the multi-particle system and an inverse number of a particle density to which a certain numeric value is multiplied, based on the Mie scattering theory by means of computer simulation, are shown in FIG. 5.

Note that such computer simulations are performed on the assumption that light having a certain limited angle of divergence is made incident onto optical mediums having cubic shapes with a variety of sizes from 10 mm cube to 1000 mm cube, which contain the particles therein. Specifically, the incident light and the size of the cube change analogically. Moreover, the particle diameter Dp is changed in a wide range from the Rayleigh scattering range to the Fresnel diffraction range. Moreover, in the computer simulation for the relationship, it is assumed that the light is emitted from a position opposite with an incident side thereof in the same direction as the incident light, and that light taking efficiency at ends of the cubes, from which the light is emitted, is approximately 80%.

From FIGS. 4 and 5, it is understood that there is an intimate relationship between the scattering cross section and the number of particles of the optical medium with the limited size.

<Lambert-Beer Law and Scattering Cross Section>

According to the Lambert-Beer law, transmittivity T when a parallel luminous flux is made incident onto an isotropic medium is represented as:

$$T = I/Io = \exp(-\rho \cdot x) \quad (10)$$

where x: distance
Io: intensity of incident light
I: intensity of emitted light
$\rho$: attenuation constant When the scattering cross section of the particles is Φ, and the number of particles per unit volume, which are contained in the medium, is Np, the above-described attenuation constant ρ is conceived to be:

$$\rho = \Phi \cdot Np \cdot Kc \quad (11)$$

Here, $K_C$ is a dimensionless correction coefficient empirically obtained when the light propagates through the optical medium of the limited space.

Moreover, parameters generally required in designing the light guide are the volume V of the optical medium, the number of mixed particles $N_{PT}$ and the particle diameter Dp. How the intensity of the emitted light is changed in this case is examined.

Here, Np is represented as $Np = N_{PT}/V$. Furthermore, $K_C$ is determined from comparison/analogy with the data in FIG. 4 and FIG. 5 and some data (not shown). In this calculation, Kc=0.004 was obtained from FIG. 4, FIG. 5 and some data (not shown). The particle diameter Dp and the scattering cross section Φ are associated with each other by expressions (7) and (9). Therefore, when length of the optical medium in the optical axis direction is $L_G$, the light taking-out efficiency Eout is given by:

$$Eout = \exp\{-(\Phi \cdot Np \cdot L_G \cdot K_C)\} \quad (13)$$

From this expression (13), it is understood that the taking-out efficiency can be made constant when $\Phi \cdot Np \cdot L_G$ is set equal to CONST. Specifically, it is satisfactory if Np is changed in response to the length $L_G$ of the optical medium in the optical axis direction.

Furthermore, in the case where no particles are present, when being represented by a loss coefficient $K_L$ obtained by synthesizing the shape of the cube, an intensity distribution of the incident light, a Fresnel loss depending on an incident angle, internal transmittivity and the like, the above-described expression (13) is transformed to:

$$Eout = \exp\{-(\Phi \cdot Np \cdot L_G \cdot K_C)\}K_L \quad (14)$$

Specifically, the taking-out efficiency Eout can be determined by the scattering cross section Φ of the particles, the particle density Np, the length $L_G$ of the optical medium in the light propagation direction, the correction coefficient $K_C$ and the loss coefficient $K_L$. In other words, when desired light taking-out efficiency Eout is given, the light taking-out efficiency is realized if the above-described expression (14) is satisfied.

<Fresnel Loss Factor>

With regard to the Fresnel loss, reflectivity is first considered. When a p-polarization component is Rp, and an s-polarization component is Rs, both are represented as:

$$Rp = \tan(\theta i - \theta r)/\tan(\theta i + \theta r) \quad (15a)$$

$$Rs = -\sin(\theta i - \theta r)/\sin(\theta i + \theta r) \quad (15b)$$

where θi: incident angle
θr: refraction angle

Therefore, intensity Ir of reflected light is obtained from expressions (15a) and (15b) as:

$$Ir = (Rp^2 + Rs^2)/2 \quad (16)$$

From this expression (16), transmitted light intensity It is obtained as:

$$It = 1 - Ir \quad (17)$$

When transmitted light intensity considering the intensity distribution of the incident light is It', expression (17) is transformed to:

$$It'(\theta i) = It(\theta i) \cdot D(\theta i) \quad (18)$$

D(θi): intensity distribution function

<Calculation of Fresnel Loss>

When a luminous flux having an arbitrary angle of divergence is incident onto the optical medium, the Fresnel loss is changed for the arbitrary incident angle θi. When the maximum incident angle of the luminous flux is θmax, the Fresnel loss on the boundary surfaces is represented as:

[Expression 2]

$$\int_0^{\theta max} It(\theta i) \cdot D(\theta i) d\theta i \Big/ \int_0^{\theta max} D(\theta i) d\theta i \quad (19)$$

Here, when it is assumed that the intensity distribution of the incident light has a rectangular shape for the purpose of simplifying the calculation, expression (19) is transformed to:

[Expression 3]

$$\int_0^{\theta max} It(\theta i) d\theta i \Big/ \int_0^{\theta max} d\theta i \quad (20)$$

Results of obtaining the Fresnel losses for the variety of refractive indices of the optical medium based on this expression (20) are shown in FIG. 6. Note that, in FIG. 6, the losses are shown by taking the transmittivity along an axis of ordinates. Specifically, transmittivity of 1 corresponds to a loss of 0.

<Calculation of Light Taking-Out Efficiency, Including Fresnel Loss>

From FIG. 6, it is understood that, in the case where the incident angle is 30° or less, even if the refractive index of the optical medium and the refractive index of the peripheral medium largely differ from each other, the Fresnel losses of both become substantially the same. Now, in the case where the optical medium is a sheet cuboid, it is conceived that a direction cosine of a light beam in the reflection/refraction is stored, and that the incident angle and the emitting angle become the same when no particles are present. Moreover, a product of the transmittivity of the incident surface and the transmittivity of the emitting surface becomes total transmittivity Ttotal when the transmittivities can be approximated to the internal transmittivity Tin≈1. Accordingly, when the refractive index of the optical medium is set as: n=1.5, Ttotal becomes equal to 0.92.

Therefore, expression (14) is transformed to:

$$Eout = \exp\{-(\Phi \cdot Np \cdot L_G \cdot K_C)\} \cdot 0.92 \quad (14b)$$

Results of obtaining the relationship between the particle diameter and the light taking-out efficiency by means of this expression (14b) are shown in FIGS. 7A to 7E. Note that, when the intensity of the incident light has some distribution, and when the incident angle of the incident light is 30° or more, it is satisfactory if the Fresnel loss is obtained by expression (19) and expression (20) and assigned to expression (14b). However, it is desirable to set the divergence of the incident angle at approximately 30° by a half angle in consideration of a critical angle at the time of emission.

FIGS. 7A to 7E show, for light taking-out efficiencies as average targets of the respective particle diameters, which are first determined, calculated values (10 mmC, 100 mmC and 1000 mmC) in the respective particle diameters and results of a precise simulation (S 10 mm, S 100 mm and S 1000 mm) by the particle diameters and densities for use in this calculation method. The light taking-out efficiencies as the average targets are 80%, 70%, 60%, 50% and 40% in FIGS. 7A, 7B, 7C, 7D and 7E, respectively. The scattering cross section Φ is obtained according to the Rayleigh theory when the particle diameter is 20 nm, and according to the Mie theory when the particle diameter is 200 nm or more. Reference symbol S denotes the results of the simulation, and reference symbol C denotes the results of this calculation. Moreover, numeric values represent the lengths $L_G$ of the optical medium in the light propagation direction.

According to FIGS. 7A to 7E, it is understood that, when the light taking-out efficiencies as the average targets are 60% or more, errors from the results of the simulation remain within a range of less than 10%, and that both coincide well with each other. Specifically, in other words, FIGS. 7A to 7E show that the errors remain within the range of less than 10% when the value of $\Phi \cdot Np \cdot L_G \cdot K_C$ is 0.4 or less. Moreover, FIGS. 7A to 7E simultaneously show that the errors remain within a range of less than 50% even if the above-described value is 0.9 or less. Note that, for the value of $K_L$, 0.92 which is a value empirically obtained is used. In terms of performing the simulation and trials, it is conceived that no particular problem occurs for the purpose of setting the targets for the light taking-out efficiencies even if the errors of approximately 50% occur. Needless to say, it is not necessary to perform the simulation when the errors are less than 10%. Moreover, it becomes unnecessary to evaluate several kinds of samples and draw candidates therefrom. Accordingly, an effect that development efficiency is improved is obtained.

From the results described above, it is conceived to be possible to obtain a good solution for the light taking-out efficiency by use of expression (14) based on the results of the Rayleigh region and the Mie scattering converging region, which are relatively simple, without relying on the complicated theory of the Mie scattering. This method is one created in consideration of this finding. As described above, the desired light taking-out efficiency Eout is realized by satisfying the expression:

$$Eout = \exp\{-(\Phi \cdot Np \cdot L_G \cdot K_C)\} \cdot K_L$$

<Calculation Example>

Results of performing the calculation for the sheet cuboid based on expression (14) are shown in Tables 1 to 3 and FIGS. 8A to 8C. Note that it is FIG. 8A that shows numeric values of Table 1 in a graph, and in a similar manner, Table 2 and Table 3 correspond to FIG. 8B and FIG. 8C, respectively. In the calculation results in these Tables, any of the values of $\Phi \cdot Np \cdot L_G \cdot K_C$ is 0.9 or less. Note that, in any of the cases, a value of $K_L$ is 0.92.

TABLE 1

Eout = 0.8

| Particle diameter (nm) | Scattering cross section (m²) | Particle density (pieces/mm³) | W × T × $L_G$ (mm) | Taking-out efficiency, expression (14) (%) | Taking-out efficiency, SIM (%) |
|---|---|---|---|---|---|
| 20 | $1.1 \times 10^{-22}$ | $1.0 \times 10^{13}$ | 4 × 1 × 20 | 84 | 87 |
|  |  | $2.5 \times 10^{12}$ | 16 × 1 × 80 |  | 88 |
|  |  | $6.3 \times 10^{11}$ | 64 × 1 × 320 |  | 88 |
| 200 | $1.5 \times 10^{-14}$ | $3.0 \times 10^{7}$ | 4 × 1 × 20 | 89 | 89 |
|  |  | $7.5 \times 10^{6}$ | 16 × 1 × 80 |  | 89 |
|  |  | $1.9 \times 10^{8}$ | 64 × 1 × 320 |  | 89 |
| 2000 | $12.6 \times 10^{-12}$ | $3.0 \times 10^{5}$ | 4 × 1 × 20 | 68 | 75 |
|  |  | $7.5 \times 10^{4}$ | 16 × 1 × 80 |  | 76 |
|  |  | $1.9 \times 10^{4}$ | 64 × 1 × 320 |  | 76 |
| 20000 | $6.3 \times 10^{-10}$ | $3.0 \times 10^{3}$ | 4 × 1 × 20 | 79 | 86 |
|  |  | $7.5 \times 10^{2}$ | 16 × 1 × 80 |  | 86 |
|  |  | $1.9 \times 10^{2}$ | 64 × 1 × 320 |  | 86 |
| 200000 | $6.3 \times 10^{-8}$ | $3.0 \times 10^{1}$ | 4 × 1 × 20 | 79 | 90 |
|  |  | $7.5 \times 10^{0}$ | 16 × 1 × 80 |  | 90 |
|  |  | $1.9 \times 10^{0}$ | 64 × 1 × 320 |  | 90 |
|  |  | Cuboid (Sheet) |  |  |  |

Note)
SIM: simulation

TABLE 2

Eout = 0.7

| Particle diameter (nm) | Scattering cross section (m²) | Particle density (pieces/mm³) | W × T × $L_G$ (mm) | Taking-out efficiency, expression (14) (%) | Taking-out efficiency, SIM (%) |
|---|---|---|---|---|---|
| 20 | $1.1 \times 10^{-22}$ | $2.0 \times 10^{13}$ | 4 × 1 × 20 | 78 | 82 |
|  |  | $5.0 \times 10^{13}$ | 16 × 1 × 80 |  | 83 |
|  |  | $1.3 \times 10^{12}$ | 64 × 1 × 320 |  | 83 |

TABLE 2-continued

Eout = 0.7

| Particle diameter (nm) | Scattering cross section ($m^2$) | Particle density (pieces/$mm^3$) | W × T × $L_G$ (mm) | Taking-out efficiency, expression (14) (%) | Taking-out efficiency, SIM (%) |
|---|---|---|---|---|---|
| 200 | $1.5 \times 10^{-14}$ | $6.0 \times 10^7$ | 4 × 1 × 20 | 85 | 85 |
|  |  | $1.5 \times 10^7$ | 16 × 1 × 80 |  | 85 |
|  |  | $3.8 \times 10^6$ | 64 × 1 × 320 |  | 84 |
| 2000 | $12.6 \times 10^{-12}$ | $4.5 \times 10^5$ | 4 × 1 × 20 | 59 | 65 |
|  |  | $1.1 \times 10^5$ | 16 × 1 × 80 |  | 65 |
|  |  | $2.8 \times 10^4$ | 64 × 1 × 320 |  | 58 |
| 20000 | $6.3 \times 10^{-10}$ | $4.5 \times 10^3$ | 4 × 1 × 20 | 73 | 79 |
|  |  | $1.1 \times 10^3$ | 16 × 1 × 80 |  | 79 |
|  |  | $2.8 \times 10^2$ | 64 × 1 × 320 |  | 70 |
| 200000 | $6.3 \times 10^{-8}$ | $4.5 \times 10^1$ | 4 × 1 × 20 | 73 | 86 |
|  |  | $1.1 \times 10^1$ | 16 × 1 × 80 |  | 86 |
|  |  | $2.8 \times 10^0$ | 64 × 1 × 320 |  | 78 |
|  |  | Cuboid (Sheet) |  |  |  |

Note)
SIM: simulation

TABLE 3

Eout = 0.6

| Particle diameter (nm) | Scattering cross section ($m^2$) | Particle density (pieces/$mm^3$) | W × T × $L_G$ (mm) | Taking-out efficiency, expression (14) (%) | Taking-out efficiency, SIM (%) |
|---|---|---|---|---|---|
| 20 | $1.1 \times 10^{-22}$ | $3.2 \times 10^{13}$ | 4 × 1 × 20 | 70 | 78 |
|  |  | $8.0 \times 10^{12}$ | 16 × 1 × 80 |  | 79 |
|  |  | $2.0 \times 10^{12}$ | 64 × 1 × 320 |  | 79 |
| 200 | $1.5 \times 10^{-14}$ | $1.2 \times 10^8$ | 4 × 1 × 20 | 79 | 78 |
|  |  | $3.0 \times 10^7$ | 16 × 1 × 80 |  | 78 |
|  |  | $7.5 \times 10^6$ | 64 × 1 × 320 |  | 77 |
| 2000 | $12.6 \times 10^{-12}$ | $9.0 \times 10^5$ | 4 × 1 × 20 | 37 | 41 |
|  |  | $2.3 \times 10^5$ | 16 × 1 × 80 |  | 40 |
|  |  | $5.6 \times 10^4$ | 64 × 1 × 320 |  | 36 |
| 20000 | $6.3 \times 10^{-10}$ | $9.0 \times 10^3$ | 4 × 1 × 20 | 59 | 60 |
|  |  | $2.3 \times 10^3$ | 16 × 1 × 80 |  | 60 |
|  |  | $5.6 \times 10^2$ | 64 × 1 × 320 |  | 52 |
| 200000 | $6.3 \times 10^{-8}$ | $9.0 \times 10^1$ | 4 × 1 × 20 | 59 | 73 |
|  |  | $2.3 \times 10^1$ | 16 × 1 × 80 |  | 73 |
|  |  | $5.6 \times 10^0$ | 64 × 1 × 320 |  | 64 |
|  |  | Cuboid (Sheet) |  |  |  |

Note)
SIM: simulation

In FIGS. 8A to 8C, reference symbols (C) and (S) denote the results of this calculation and the precise simulation, respectively. Moreover, numeric values represent dimension (mm) of the optical mediums. Furthermore, the light taking-out efficiencies as the targets are set at the averages of the respective particle diameters. As apparent from Tables 1 to 3 and FIGS. 8A to 8C, it is understood that the results of this calculation and the results of the simulation coincide well with each other. In particular, the results in the particle diameter of 2000 nm make it far more apparent that this calculation method coincides with the simulation.

<Distribution Characteristics of Emitted Light Intensity>

Distribution characteristics of emitted light intensity are affected by an intensity distribution of light from light sources, an angle of divergence thereof, the number and location of the light sources and the like, and were accordingly evaluated by the simulation. The distribution characteristics of the emitted light intensity for each particle diameter, which were thus obtained, are shown in FIGS. 9A, 9B and 9C. Here, it is assumed that the light source is located at a center of an incident-side cross section of the optical medium, and the angle of divergence is set at 30° by a half angle. FIGS. 9A, 9B and 9C show results of performing the simulation for the case of the sheet cuboids under the same conditions as in Table 1, and show the results of the cases where sheet sizes thereof are small, medium and large, respectively.

From these graphs, it is understood that substantially even intensity distributions are realized at approximately 90% of the light taking-out efficiency in the optical mediums of which cross sections are rectangular. From the above consideration and the computer simulation, when the light guide is manufactured by mixing the particles generating the light scattering into the arbitrary optical medium, first, based on expression (14), the light taking-out efficiency can be drawn in advance from the scattering cross section, the particle density, the dimension of the optical medium and the like according to each particle diameter. Furthermore, the distribution characteristics of optical intensity may be obtained by the precise simulation. Alternatively, it is also possible to make several kinds of samples according to the conditions drawn in advance from expression (14), and to experimentally evaluate the samples.

Moreover, the sheet light guide for use in the present invention is configured to satisfy the relationship of: $\Phi \cdot Np \cdot L_G \cdot K_C \leq 0.9$ as described above. Accordingly, the errors from the results of the simulation remain within the range of less than 10%. Therefore, good light taking-out efficiency and a uniform intensity distribution of the emitted light can be realized.

Moreover, the sheet light guide for use in the present invention is that which propagates light therethrough while making the light repeatedly scatter by the particles in the optical medium. Accordingly, both of the following are possible in a similar manner: one is to make the light incident from one end surface and to propagate the light to the other end surface; and the other is to make the light incident from the above-described other end surface and to propagate the light to the above-described one end surface. Accordingly, it becomes possible for a communication system using the sheet light guide of the present invention to perform two-way communication.

<Necessary Condition of Communication System Using Sheet Light Guide>

A typical sheet light guide for communication is shown in FIG. 10. As described above, a sheet light guide 10 is that which is formed by containing the light-scattering particles in the optical medium such as, for example, polymethylmethacrylate (PMMA), and propagates light incident from one end surface to the other end surface side while scattering the light by the particles. Moreover, a plurality of optical fibers 21, 22 and 23 are connected to the one end surface of the sheet light guide 10, and optical fibers 31, 32 and 33 are connected to the other end surface. To the optical fibers 21 to 23 and 31 to 33, in usual, those with large numerical apertures (N.A.) are applied, thus enabling the two-way communication.

Conditions in the case of receiving light by the optical fibers are considered. According to the paper "High-Uniformity Star Coupler Using Diffused Light Transmission" IEICE TRANS. ELECTRON, Vol. E84C, No. 3 MARCH 2001 p. 339, requirements for a photodetector in a sheet light guide system for communication are as follows.

<<20.5 dBm (0 dBM=1 mW) or More is Required as Minimum Quantity of Received Light of Photodetector>>

This is calculated from a Bit-Error-Rate (BER) in the case of transmitting/receiving a signal of 500 Mbps. Moreover, the photodetector is a PIN photodiode, and accordingly, this condition is not helpful in the case where the photodetector is different (for example, photomultiplier, avalanche photodiode and the like), or in the case where a transmission band is different. Specifically, in an arbitrary photodetector, the minimum quantity of received light which is acceptable in a certain transmission band should be present. Thus, the acceptable minimum quantity of received light of the photodetector, which satisfies the above-described condition, is defined as P(Receiver)min.

First, constraints in the case where the intensity distribution of the emitted light of the sheet light guide is flat are obtained from the above-described condition. Even if the intensity distribution of the emitted light is flat, in one optical fiber, an area ratio π/4 of the light guide path and the optical fiber in cross section necessarily leads to a loss. However, it is assumed that a core diameter of the optical fiber is equal to thickness of the sheet light guide. Moreover, a tolerance is not considered at present.

When the number of branches (number of nodes) is N, the quantity of light is lowered to 1/N, and π/4 of the lowered quantity is counted as a loss. Then, the quantity of light P(Receiver) received by the photodetector in an ideal case is represented as:

$$P(\text{Receiver}) = E\text{out} \cdot (1/N) \cdot \pi/4 \quad (21)$$

Here, it is assumed that the photodetector receives all of the emitted light from the optical fiber. Thus, when a quantity of incident light onto the light guide is Pin, expression (21) is transformed to:

$$P(\text{Receiver}) = P\text{in} \cdot E\text{out} \cdot (1/N) \cdot \pi/4 \quad (22)$$

When a logarithm of this expression (22) is taken, the quantite of received light of the photodetector, which is represented by dBm, is established as:

$$P(\text{Receiver})_{dBm} = -10\text{Log}\{P\text{in} \cdot E\text{out} \cdot (1/N) \cdot \pi/4\} \quad (23)$$

The relationship between the quantity of received light and the number of branches (number of nodes) is shown in FIG. 11 for the cases where the quantity of incident light is 1 mW and 10 mW. As understood from FIG. 11, naturally, the quantity of received light is proportional to the quantity of emitted light. Moreover, although it is assumed here that the intensity distribution of the light emitted from the sheet light guide is a flat one, actually, when the position of the light source is changed, the intensity distribution of the emitted light is also changed. Specifically, it is conceived that fluctuations occur in the quantity of received light, and that the quantity of received light becomes the minimum at a portion where the intensity of incident light is the minimum.

Here, when the quantity Pin of light incident onto the light guide is given, a distribution profile of the emitted light when the light source is at an arbitrary position is represented by a normalization intensity distribution function D(x, y), in which a direction where the intensity distribution of the emitted light is on a long side is taken as x, and a direction where the intensity distribution thereof is on a short side is taken as y. Moreover, one unit in incident and emitting portions divided by the number of branches (number of nodes) is referred to as a segment, and it is assumed that the center (optical axis) of the optical fiber is ideally positioned at the center of each segment.

Therefore, when Segi is an integration region in an i-th segment, a mean value NPi in which the quantity of emitted light is normalized in the i-th segment is represented as:

[Expression 4]

$$NPi = \int_{Segi} D(x, y)dxdy \bigg/ \int_{Seg\,max} D(x, y)dxdy \quad (24)$$

Here, Segmax denotes a segment in which the quantity of light becomes the maximum in all the segments. Moreover, in a segment in which the quantity of light becomes the minimum, NPi is represented as:

[Expression 5]

$$NPi(\min) = \int_{Seg\,min} D(x, y)dxdy \bigg/ \int_{Seg\,max} D(x, y)dxdy \quad (25)$$

In expression (23), all the quantity of emitted light Pout is represented as:

$$P\text{out} = P\text{in} \cdot E\text{out} \quad (26)$$

From this relationship, with regard to the quantity of light PSegi in the i-th segment, the number of branches, the number of segments and the number of nodes are equal to one another. Accordingly, PSegi is represented as:

[Expression 6]

$$PSegi = Pout \cdot \left\{ NPi \Big/ \sum_{i=1}^{n} NPi \right\} \quad (27)$$

Note that in this specification, for the sake of convenience, the following, included in the above-described expression (27), is described as ΣNPi:

[Expression 7]

$$\sum_{i=1}^{n} NPi$$

The above-described expression (23) and expression (27) are combined, and 1/N in the case where the intensity distribution of the emitted light is flat is replaced by ΣNPi. Then, the following expression is established:

$$P(Receiver)_{dBm} = -10 \mathrm{Log} \{Pin \cdot Eout \cdot (NPi/\Sigma NPi) \cdot \pi/4\}$$

A value necessary at present is that in the case where the quantity of light emitted from the optical fiber is the minimum, which is then given by expression (25). Specifically, when $P(Receiver\_min)_{dBm}$ is the minimum quantity of light received by the photodetector, $P(Receiver\_min)_{dBm}$ is obtained, from the above-described expression, as:

$$P(Receiver\_min)_{dBm} = -10 \mathrm{Log} \{Pin \cdot Eout \cdot (NPi(min)/\Sigma NPi) \cdot \pi/4\} \quad (28)$$

where Pin: quantity of incident light
Eout: light taking-out efficiency
NPi (min): light quantity of segment in which quantity of light becomes minimum
ΣNPi: sum of quantities of light of segments Moreover, when the minimum quantity of light required for the photodetector in order to satisfy a certain BER is $PRmin_{dBm}$, the following relationship is established:

$$PRmin_{dBm} \leq P(Receiver\_min)_{dBm}$$

Furthermore, when a coupling loss of a light emitter and the optical fiber is $K_E$, a coupling loss of the optical fiber and the sheet light guide is $K_F$, a coupling loss of the optical fiber and the photodetector is $K_R$, and an internal loss of the optical fiber $K_{FI}$, $PRmin_{dBm}$ is represented as:

$$PRmin_{dBm} \leq P(Receiver\_min)_{dBm} \cdot K_E \cdot K_F \cdot K_R \cdot K_{FI} \quad (29)$$

This expression (29) becomes the necessary condition for the communication system using the sheet light guide.

<BER (Bit-Error-Rate)>

The BER is an index indicating how much difference occurs between an original digital signal randomly generated and a received digital signal as a result of transmitting the digital signal through a certain communication medium. When the number of transmitted bits is Bits and the number of bit errors is Biter, the BER is represented as:

$$BER = Biter/Bits \quad (30)$$

Next, a mechanism of the bit error generation is considered. First, a distortion of an analog waveform when an analog signal is converted into a digital signal is mentioned as a first factor. Moreover, the bit error is increased when a signal level is lowered, and accordingly, it is necessary to consider also S/N as a factor. Even if the signal level is lowered owing to the distortion of the waveform, the bit error should not occur when the signal level stably exceeds a threshold value for distinguishing (0, 1) signals. When noise comes flying from the outside or occurs in the inside of the system to give a level change to the distorted waveform, such a phenomenon is conceived to become a cause of the bit error (refer to FIG. 12).

The maximum factor of the waveform distortion in the communication system using the sheet light guide is conceived to be a distortion of a received signal itself in which an arbitrary incident segment and an emitted segment correspond to each other, and a waveform distortion owing to a phase shift of each signal component included in a mixing signal corresponding to each incident segment and an arbitrary emitted segment. Moreover, the above-described waveform distortion results from an optical path difference of signal light. Elements causing the optical path difference in the communication system using the optical fibers and the sheet light guide are the sheet light guide itself and the optical fibers. Specifically, the bit error is estimated to occur because the signal level is lowered than a predetermined threshold value by the waveform distortion when the analog signal is converted into the digital signal. Furthermore, when it is assumed that the digital signal is accompanied with a reference signal (reference clock) when being transmitted, and that the digital signal is collated with the reference signal also when being read, it is conceived that the bit error occurs when the phase difference (jitter) is increased between the reference signal and the digitized signal. Moreover, an analog signal in the vicinity of the threshold value fluctuates with respect to the threshold value owing to fluctuations by the noise, and is converted into an erroneous digital signal. Specifically, the bit error is conceived to occur because the factor of the optical path difference and the factor of the noise are combined.

<Relationship Between Optical Path Difference and Bit-Error-Rate (BER)>

Waveform distortions for the respective numbers of nodes, which are 4, 8 and 16, in the communication systems each using the sheet light guide, are shown in FIGS. 13A and 13B (4 nodes), FIGS. 14A and 14B (8 nodes), and FIGS. 15A and 15B (16 nodes). In these communication systems, an outer diameter of each optical fiber is 1 mm, and a length thereof 1 m in which the optical path difference is ignorable. The optical fibers are provided in parallel while being brought into intimate contact with one another both on the light incident side and on the light emitting side.

Moreover, numeric values of "In" and "Out" in each graph represent a light incident position and a light emitting position by distances from a center position of the sheet light guide in the direction where the optical fibers are arrayed. The distances are represented by mm, and positions on a side where the optical fibers onto which the light is made incident are present are added with negative symbols (−), and positions on the other side are added with positive symbols (+). Specifically, FIG. 13A shows a waveform distortion in the case where the light is made incident onto an optical fiber having a center at a position of −1.5 mm from the above-described center position, that is, the second optical fiber from the center position in the negative direction (optical fiber 21 in an example of FIG. 18 to be described later) and the light is emitted from an optical fiber having a center at the same position (optical fiber 31 in FIG. 18). FIG. 13B shows a waveform distortion in the case where the light is made incident onto the optical fiber at the same position (optical fiber 21) and the light is emitted from an optical fiber having a center at a position of +1.5 mm from the above-described center position, that is, a second optical fiber from the center position in the positive direction (optical fiber 34). Moreover, FIG. 14A shows a waveform distortion in the case where the light is made incident onto an optical fiber having a center at a position of −3.5 mm from the above-described center position, that is, a fourth optical fiber from the center position in the negative direction and the light is emitted from an optical fiber having a center at the same position. FIG. 14B shows a waveform in the case where the light is made incident onto the optical fiber having the center at the same position and the light is emitted from an optical fiber having a center at a position of +3.5 mm from the center position, that is, a fourth optical fiber from the center position in the positive direction. Furthermore, FIG. 15A shows a waveform distortion in the case where the light is made incident onto an optical fiber having a center at a position of −7.5 mm from the above-described center position, that is, an eighth optical fiber from the center position in the negative direction and the light is emitted from an optical fiber having a center at the same position. FIG. 15B shows a waveform in the case where the light is made incident onto the optical fiber at the same position as described above, and the light is emitted from an optical fiber having a center at a position of +7.5 mm from the above-described center position, that is, an eighth optical fiber from the center position in the positive direction.

From these graphs, it is understood that the level change owing to the waveform distortion is ignorable in an input signal of 1 Gbps.

<Relationship between S/N and BER>

It is conceived that an occurrence of erroneous reading (bit error) is also associated with quality of the signal, that is, S/N. Specifically, even if main components from which harmonic components are removed are separated in signal spectra adjacent to one another, if the harmonic components (noise components) are large, signals cannot be distinguished as individual signals. Supposing an extreme case, it is conceived that it is usually impossible to detect such a signal embedded in the noise components unless the signal is particularly subjected to filtering processing.

As the noise component, there is extraneous noise such as radiation noise and induction noise, in addition to noise occurring in the inside of the system, such as thermal noise (Johnson Noise), quantum noise (Shot Noise), 1/f noise intrinsic to a semiconductor device for use in the light emitter and the photodetector. Here, for the purpose of evaluating performance of the system itself, the extraneous noise is ignored, and the noise occurring in the inside of the system is only considered. Moreover, an influence of the 1/f noise is ignored.

Power (Noise(Total)) of the noise components is represented as:

$$Noise(Total)=Noise(heat)+Noise(quantum) \quad (31)$$

When each component is written by the power for a photo detection element:

$$Noise(heat)=(4kT/R)\cdot\Delta v \quad (31a)$$

where k: Plank constant
T: equivalent temperature (determined by noise factor)
R: load resistance of photodetector
Δv: band of photodetector $$Noise(quantum)=3e^2\cdot(P+P_B)\cdot\eta\cdot\Delta v(h\nu)+2ei_d\cdot\Delta v \quad (31b)$$

where e: charge of electrons
P: quantity of signal light
$P_B$: quantity of background light
η: quantum efficiency
h: Plank constant
ν: frequency of signal light
$i_d$: dark current
Δv: band of photodetector Here, it is considered to rectify a signal of a 0.25 GHz, of which output is not lowered, when a signal of 0.5 Gbps is made. Specifically, the band of the photodiode is 0.25 GHz. In this case, as an example, for a Si-photodiode: S5973 made by Hamamatsu Photonix K.K., the noise components are calculated where P=8.9×10⁻⁶W (20.5 dBm), η=0.4, R=50Ω, T=300K. The calculated values converted into current values become as:

$$Noise(thermal\ rms)=2.88\times10^{-7}(A)$$

$$Noise(quantum\ rms)=8.19\times10^{-8}(A)$$

The total noise component becomes as:

$$Noise(total\ rms)=3.70\times10^{-7}(A) \quad (32)$$

Meanwhile, a signal current Sc in the minimum quantity of received light is given by:

$$Sc=P\cdot e\cdot\eta/(h\cdot\nu) \quad (33)$$

Accordingly, a signal current S (min) c at the minimum quantity of received light becomes as:

$$S(min)c=2.46\times10^{-6}(A)$$

Therefore, a signal-to-noise ratio (S/N) in this case becomes as: S/N(Pmin)=6.65.

Incidentally, the thermal noise is dominant over the distribution of the noise. Accordingly, when the thermal noise is approximated by Gaussian, a probability of occurrence of noise Pr(S/N=1) in the case where the system noise at certain timing becomes 6.65 times the rms noise, that is, in the case where a signal current level becomes equal to a noise current level (S/N=1) becomes as:

$$Pr(S/N=1)\approx3.47\times10^{-11}$$

The probability becomes a value approximate to BER≈1×10⁻¹¹, and becomes a value approximate to a probability of occurrence of the BER of the above-described U.S. Pat. No. 5,548,670. Furthermore, in the case of using a high-pass filter of approximately 20 MHz, which causes no trouble in transmission of the digital signal, the following are obtained:

$$S/N(Pmin)=6.81$$

$$Pr(S/N=1)\approx1.31\times10^{-11}$$

These substantially coincide with those described in "High-Uniformity Star Coupler Using Diffused Light Transmission" IEICE TRANS. ELECTRON, Vol. E84C, No. 3 MARCH 2001 p. 339. Specifically, the above-described results constitute grounds for considering that the conventional assumption regarding the BER is correct. Note that in FIG. 16, the relationship between a magnitude of the root mean square (rms) noise and a probability of occurrence thereof is shown.

Furthermore, the assumption regarding the BER is further advanced, and a more practical technique is considered. First, typical rms noise (voltage value) in the communication system using the sheet light guide is measured, and the Noise(System_rms) is defined. Moreover, when the BER acceptable in the system is defined as BER(accept) and power of a photodetection signal is defined as PRmin, a signal voltage S(PRmin)v is represented as:

$$S(PRmin)v=PRmin\cdot e\cdot\eta/(h\cdot\nu)\times R \quad (34)$$

where R is a load resistance. Moreover, a level of the threshold value of the (0, 1) signal is defined as V(Thresh), and S/N(Thresh) considering the level of the threshold value is defined by:

$$S/N(\text{Thresh}) = \{S(PR\text{min})v - V(\text{Thresh})\}/\text{Noise (System\_rms)} \quad (35)$$

When expression (35) reaches a certain value, the BE occurs at a certain probability, which is defined as S/Naccept. In this case, from the above-described consideration, it is conceived that the probability of occurrence of the Noise(System_rms) is equal to the BER. FIG. 17 shows the relationship between the BER calculated from the above-described consideration and the quantity of received light. This relationship is very approximate to the result of the actual measurement of "High-Uniformity Star Coupler Using Diffused Light Transmission" IEICE TRANS. ELECTRON, Vol. E84C, No. 3 MARCH 2001 p. 339, and a shape thereof is also very analogous to that thereof.

Considering the V(Thresh), the BE occurs when a value obtained by subtracting the noise component from the signal component is lowered than the V(Thresh) and when a value obtained by adding the noise component to the "0" level exceeds the V(Thresh). Therefore, it is conceived desirable that the V(Thresh) be set at a half value of an average signal voltage.

From the above, in the communication system using the sheet light guide, a communication system configured in the following manner can be defined. When the acceptable BER, that is, BER(accept) is given, and the rms noise of the system is defined as the Noise(System_rms), the probability of occurrence Pr(Noise(System_rms) ) of the Noise (System_rms) is Noise(Systme_rms) of a magnitude which satisfies the following in a band where it is not necessary to consider the distortion of the signal waveform:

$$Pr(\text{Noise(System\_rms)} \cdot Q) \leq BER(\text{accept}) \quad (36)$$

where Q is a proportionality constant.

When an arbitrary threshold value V(Thresh) in binarization is given, the signal level is of the input signal PRmin which satisfies:

$$\{S(PR\text{min})v - V(\text{Thresh})\} > \text{Noise(System\_rms)} \cdot Q \quad (37)$$

Moreover, the signal level is of the signal voltage S(PRmin)v outputted through a load resistor from a photodetector which satisfies expression (37).

Alternatively, for the above-described reason, the above-described expression (37) can also be defined as:

$$S(PR\text{min})v/2 > \text{Noise(System\_rms)} \cdot Q \quad (38)$$

Furthermore, such a circuit configuration as capable of measuring the BER in the inside of the system is provided, the output power PRmin of the light source is adjusted so as to satisfy the Ber(accept), and thus expression (37) and expression (38) may be satisfied. In this case, a digital circuit which makes feedback from the BER measurement circuit to the light source side is provided, and this digital circuit is made as one which controls the quantity of light of the light source according to a table determined based on the BER (accept). Thus, the digital circuit becomes capable of also coping with the extraneous noise other than the Noise (System_rms) generated by the system itself.

BRIEF DESCRIPTION OF THE DRAWINGS

FIG. 18 is a plan view showing a communication system according to an embodiment of the present invention.

FIG. 19A is an elevation view showing a shape of an incident/emitting end surface of the sheet light guide used in the system of FIG. 18, and FIG. 19B is an explanatory view showing a positional relationship between the end surface and optical fibers.

FIG. 20A is an elevation view showing the sheet light guide according to another embodiment of the present invention, and FIG. 20B is an explanatory view showing a positional relationship between the end surface and the optical fibers.

DESCRIPTION OF THE PREFERRED EMBODIMENT

Figure 1:
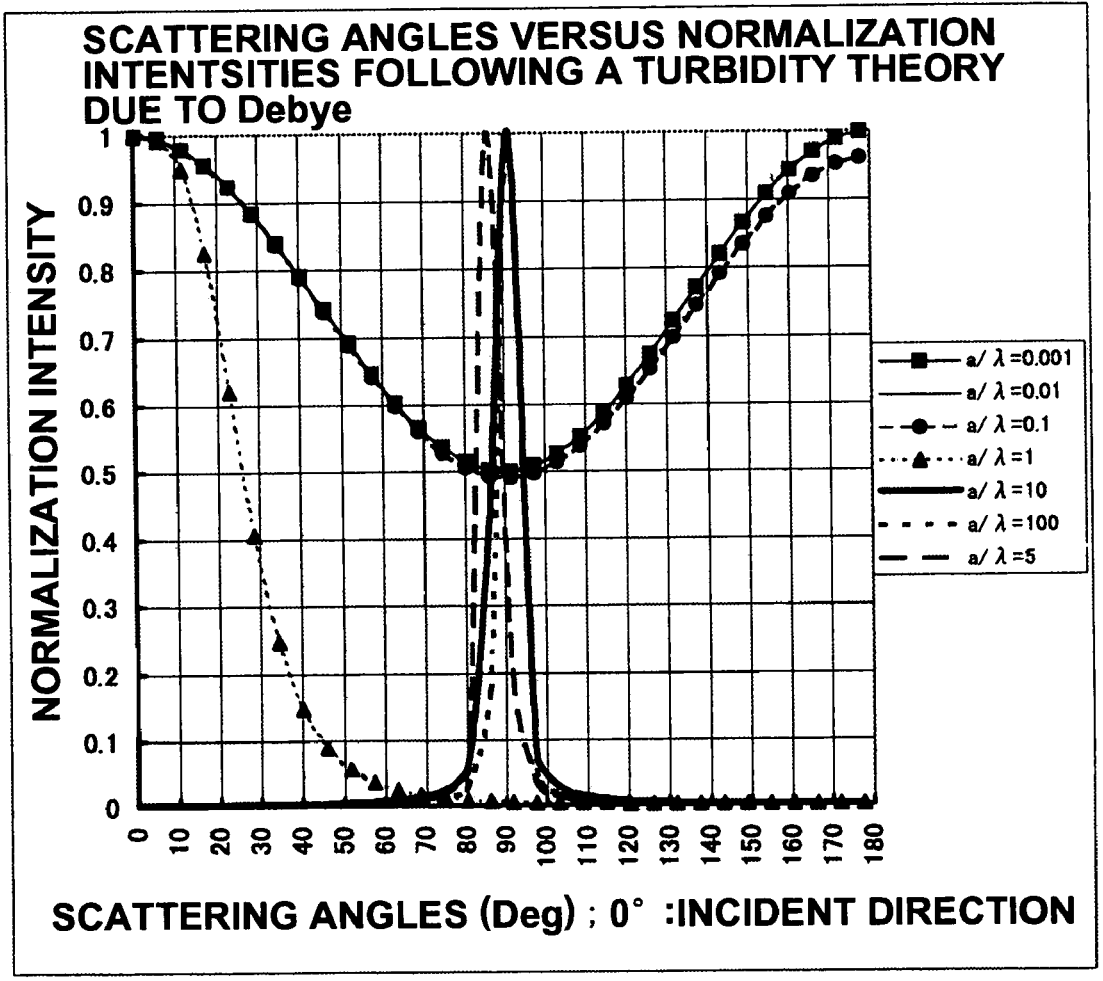
FIG. 1 is a graph showing scattering angles versus normalization intensities following a turbidity theory due to Debye.
Figure 2:
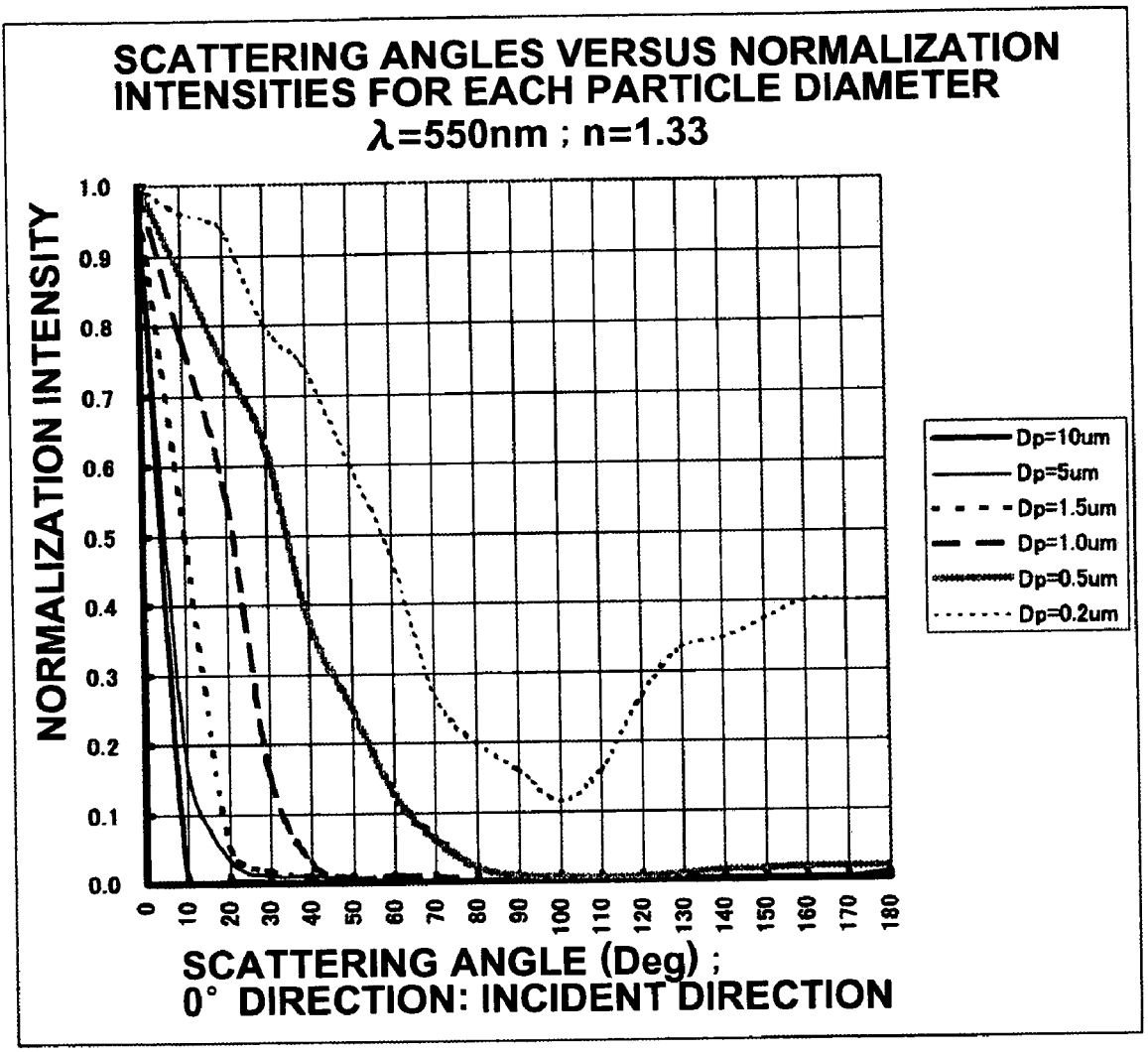
FIG. 2 is a graph showing scattering angles versus normalization intensities following the Mie scattering theory.
Figure 3A:
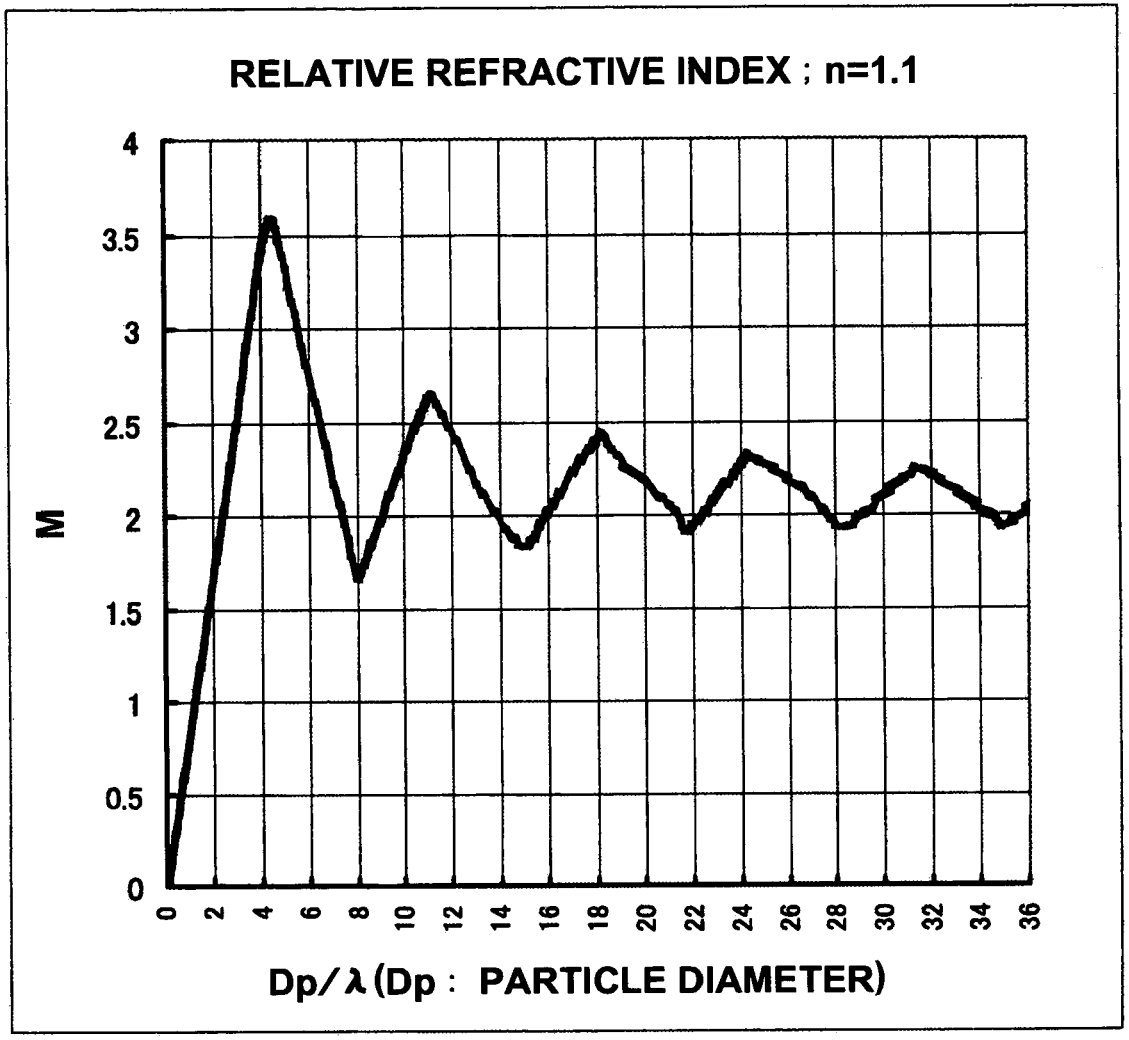
FIG. 3A is a graph showing a state where a scattering cross section oscillates when a relative refractive index is 1.1, in the Mie scattering theory.
Figure 3B:
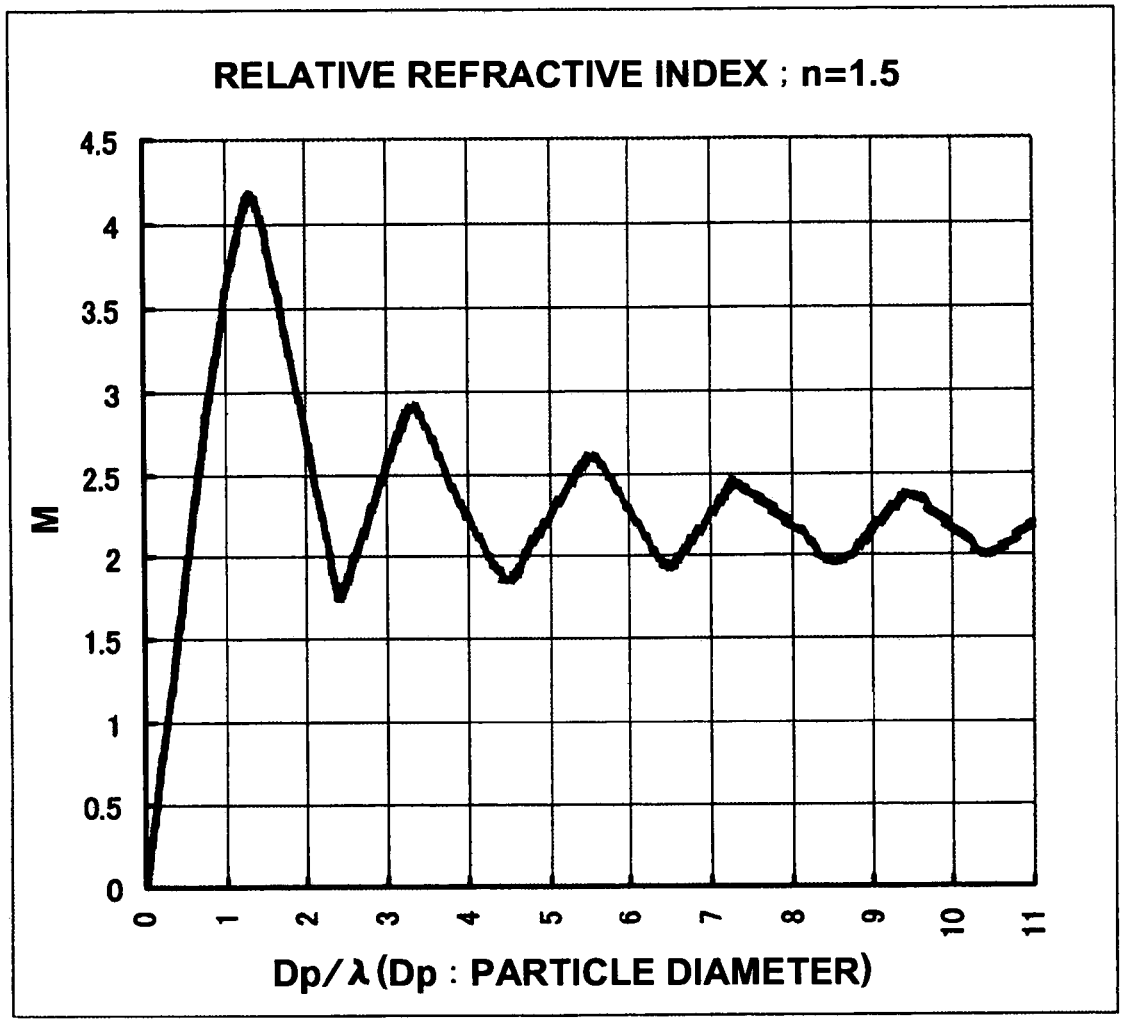
FIG. 3B is a graph showing a state where the scattering cross section oscillates when the relative refractive index is 1.5, in the Mie scattering theory.
Figure 3C:
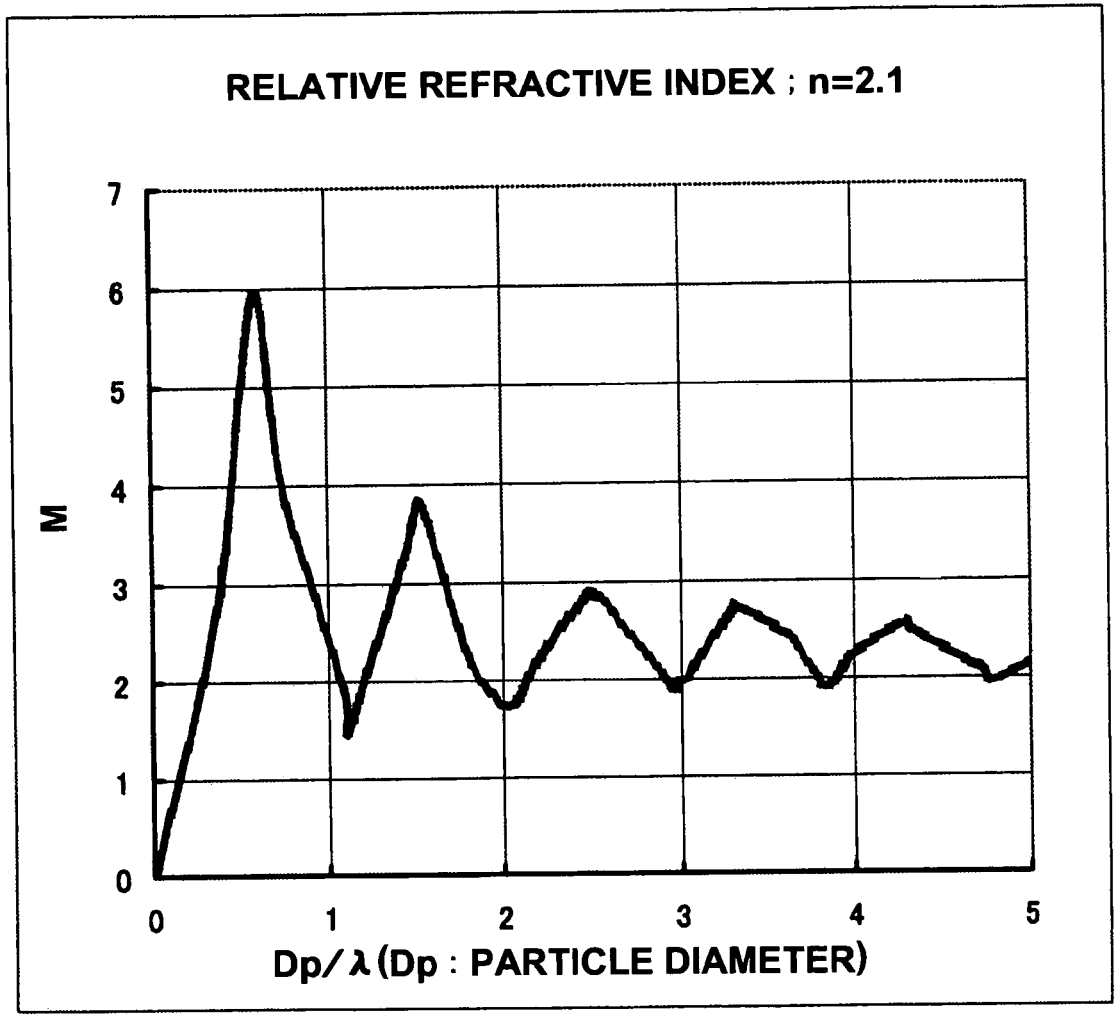
FIG. 3C is a graph showing a state where the scattering cross section oscillates when the relative refractive index is 2.1, in the Mie scattering theory.
Figure 4:
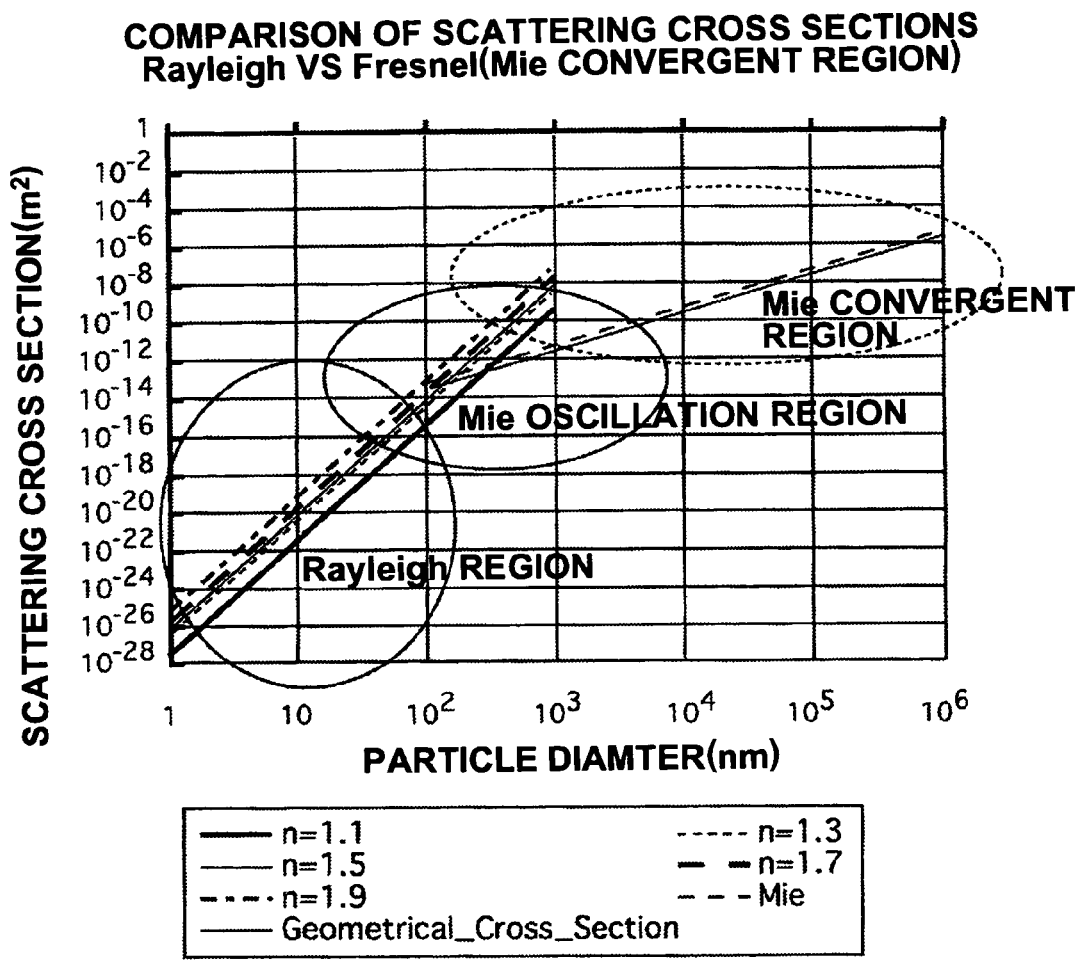
FIG. 4 is a graph showing results of obtaining the relationship between a particle diameter and the scattering cross section for each of some refractive indices by means of computer simulation.
Figure 5:
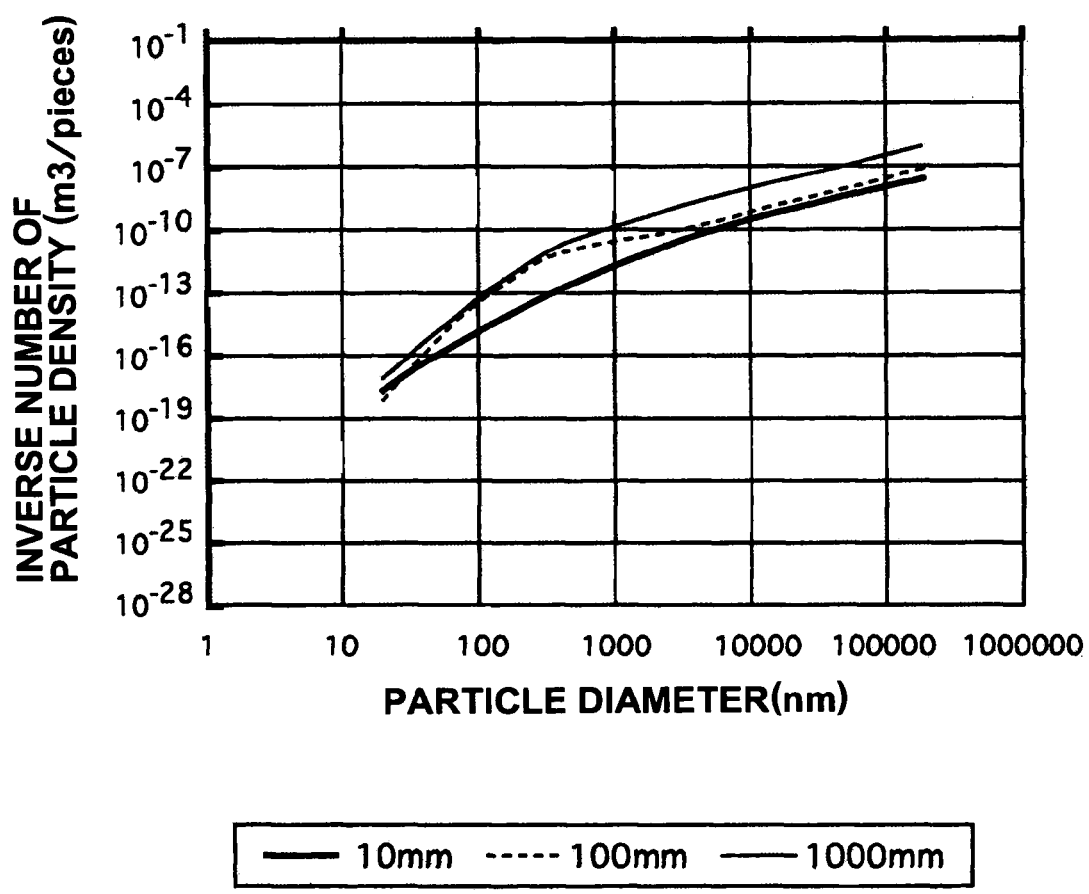
FIG. 5 is a graph showing results of obtaining the relationship between a particle diameter in a multi-particle system and an inverse number of a particle density by means of the computer simulation.
Figure 6:
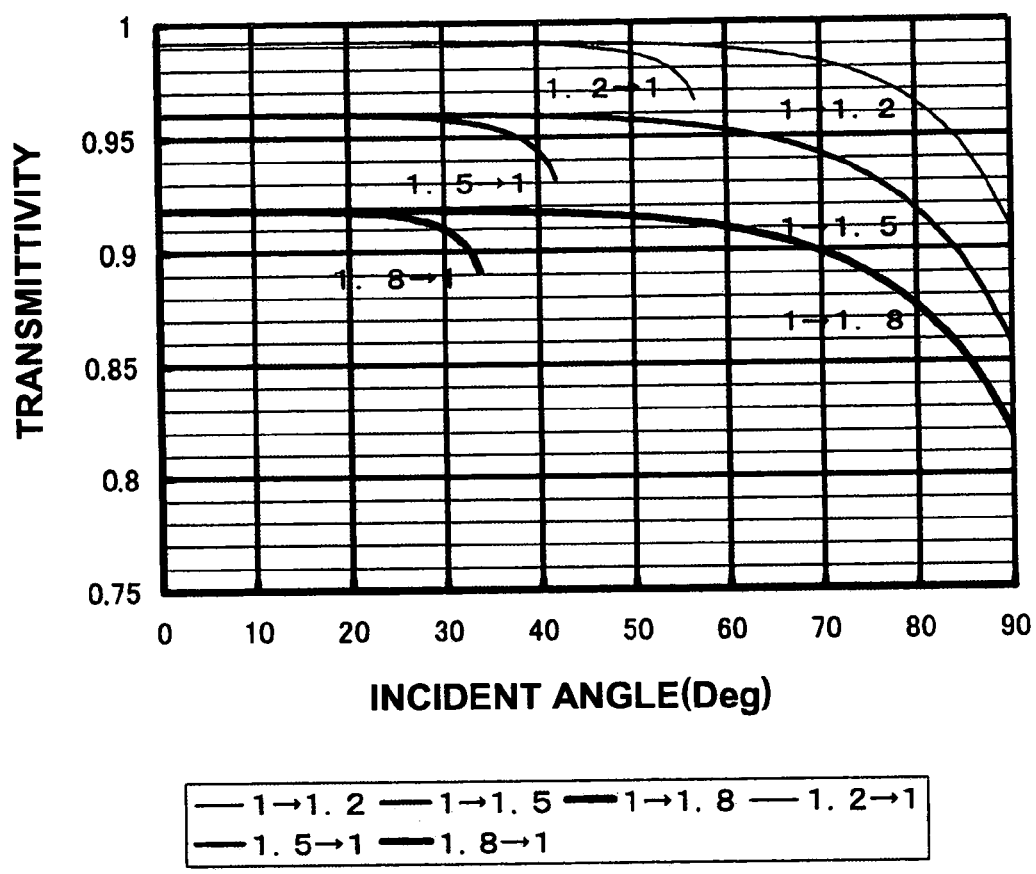
FIG. 6 is a graph showing Fresnel losses for a variety of refractive indices of an optical medium.
Figure 7A:
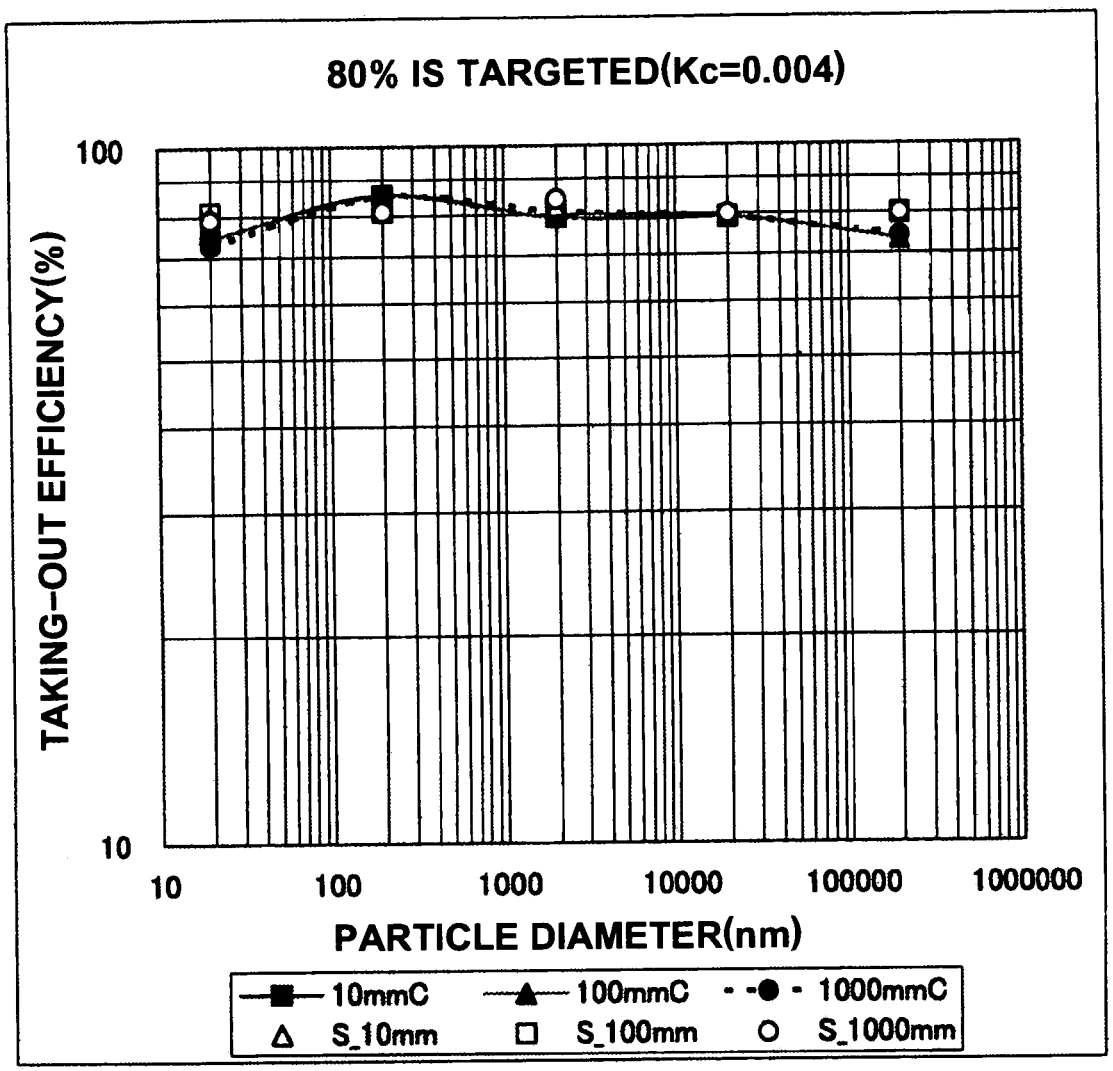
FIG. 7A is a graph showing the relationship between the particle diameter and light taking-out efficiency while comparing results thereof obtained by a method of the present invention and the computer simulation with each other (light taking-out efficiency of 80% is targeted).
Figure 7B:
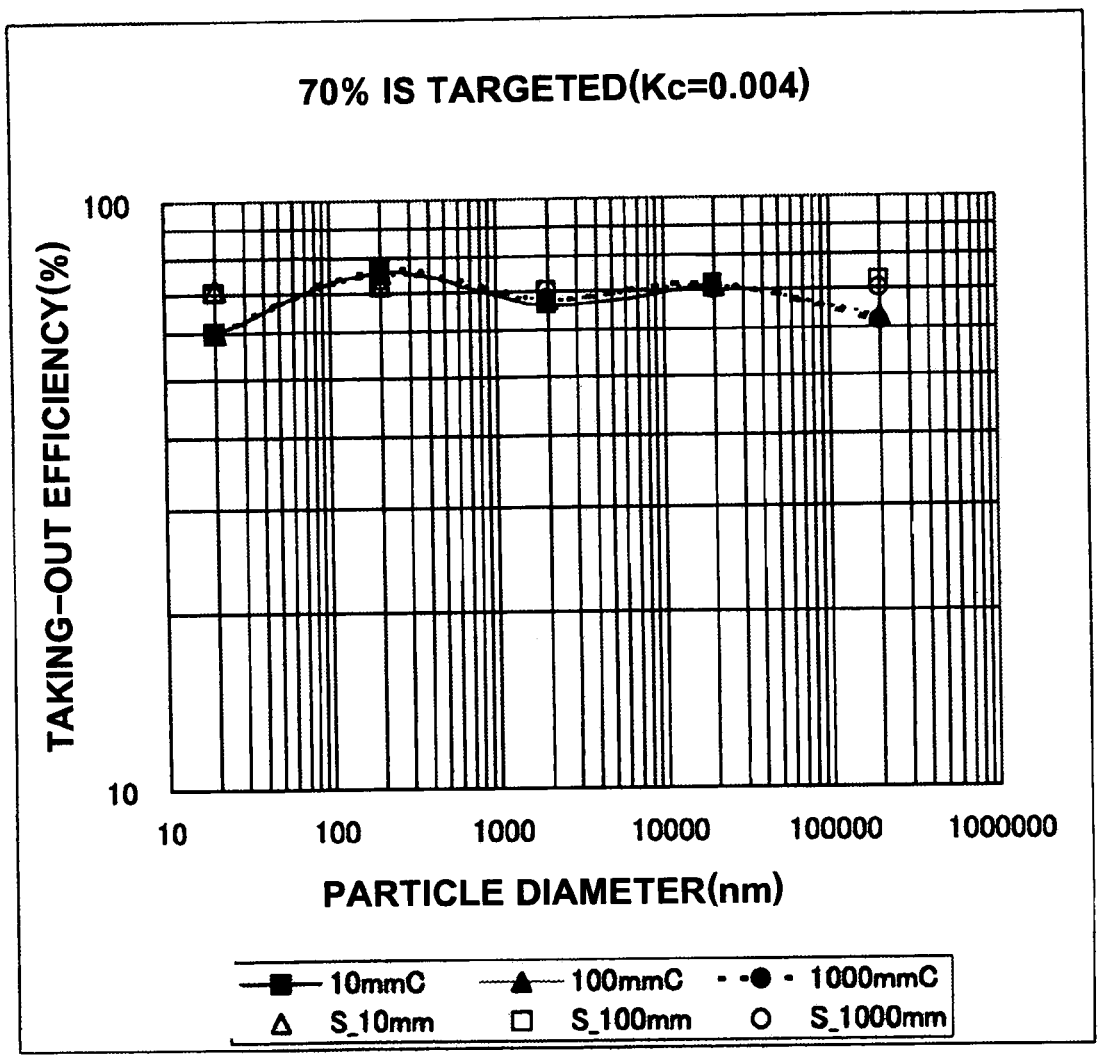
FIG. 7B is a graph showing the relationship between the particle diameter and light taking-out efficiency while comparing results thereof obtained by the method of the present invention and the computer simulation with each other (light taking-out efficiency of 70% is targeted).
Figure 7C:
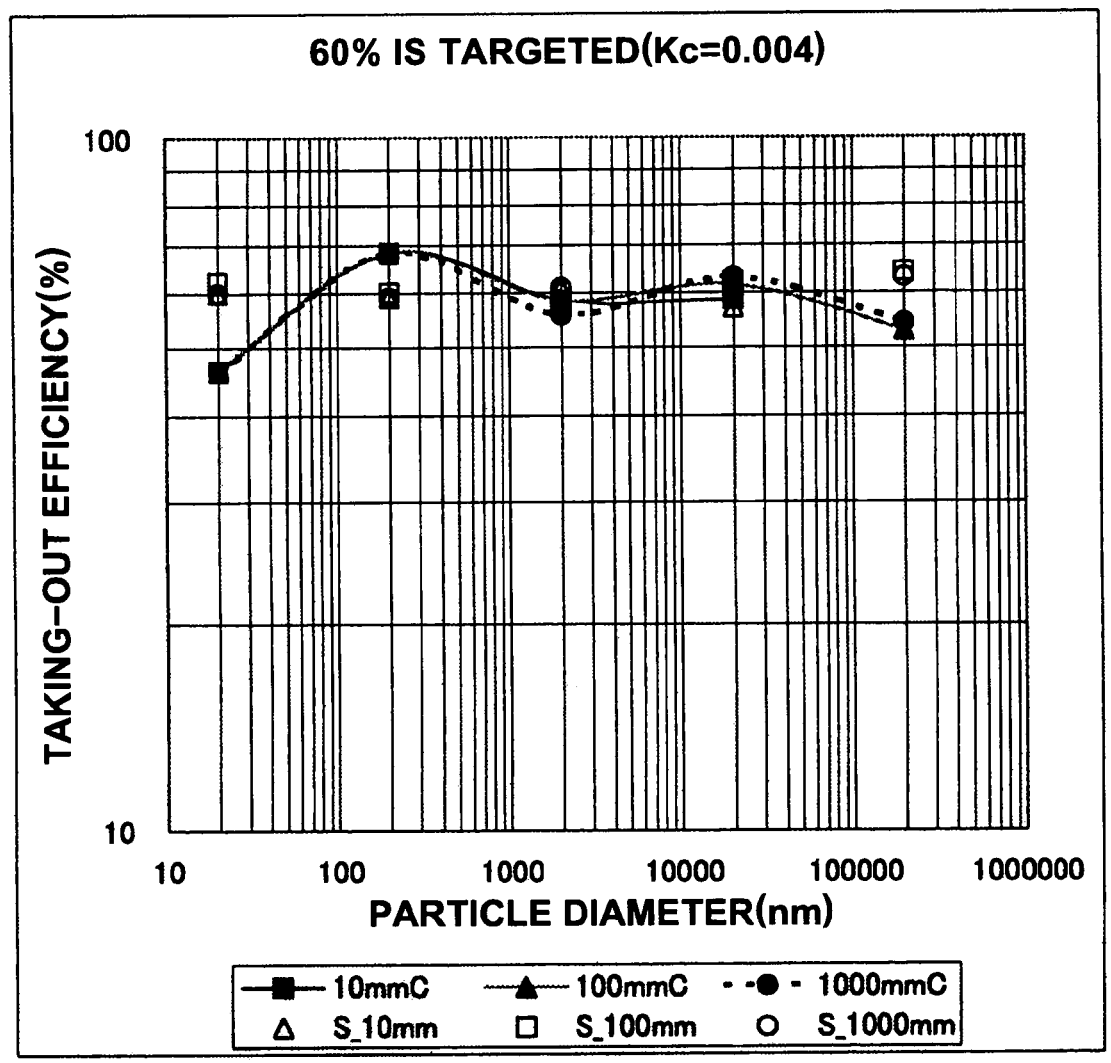
FIG. 7C is a graph showing the relationship between the particle diameter and the light taking-out efficiency while comparing results thereof obtained by the method of the present invention and the computer simulation with each other (light taking-out efficiency of 60% is targeted).
Figure 7D:
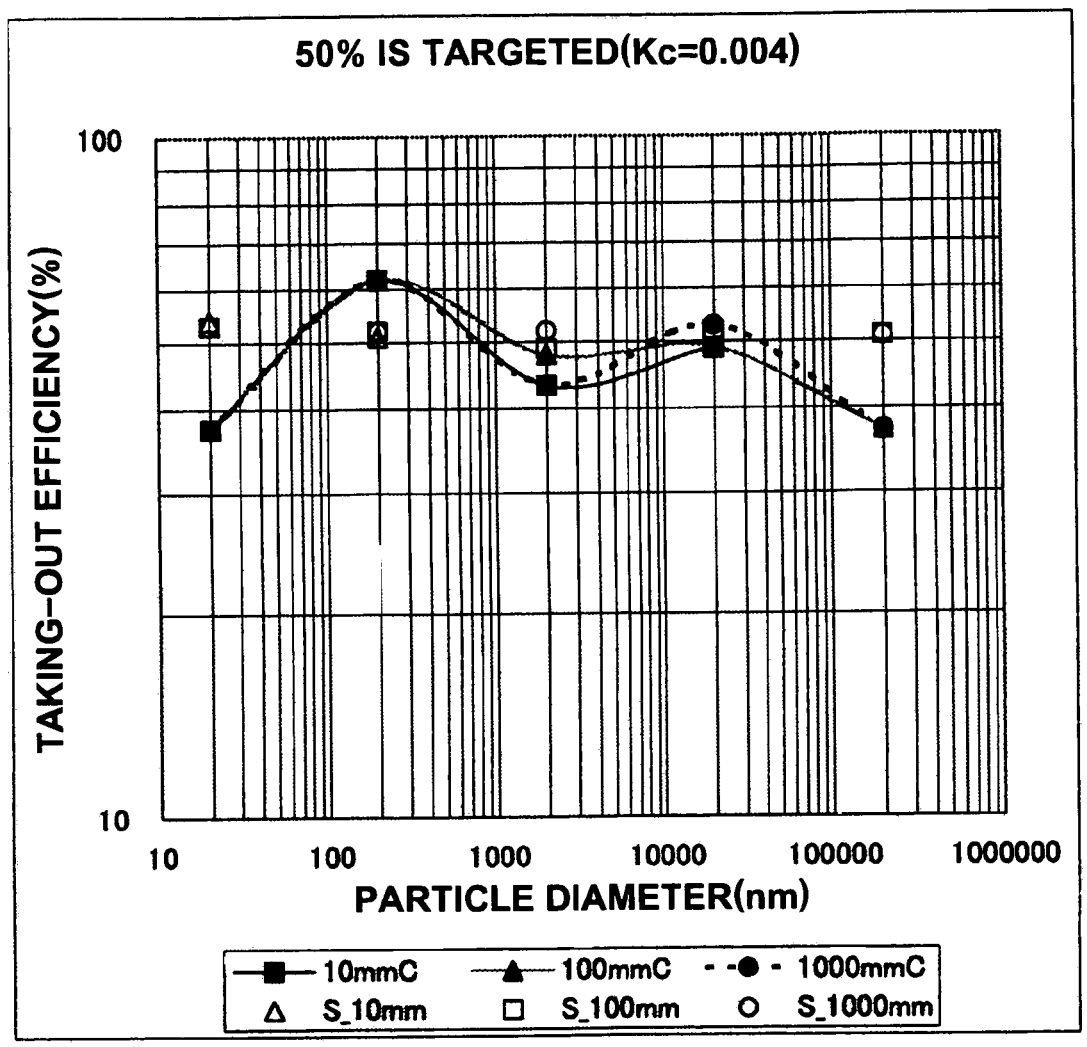
FIG. 7D is a graph showing the relationship between the particle diameter and the light taking-out efficiency while comparing results thereof obtained by the method of the present invention and the computer simulation with each other (light taking-out efficiency of 50% is targeted).
Figure 7E:
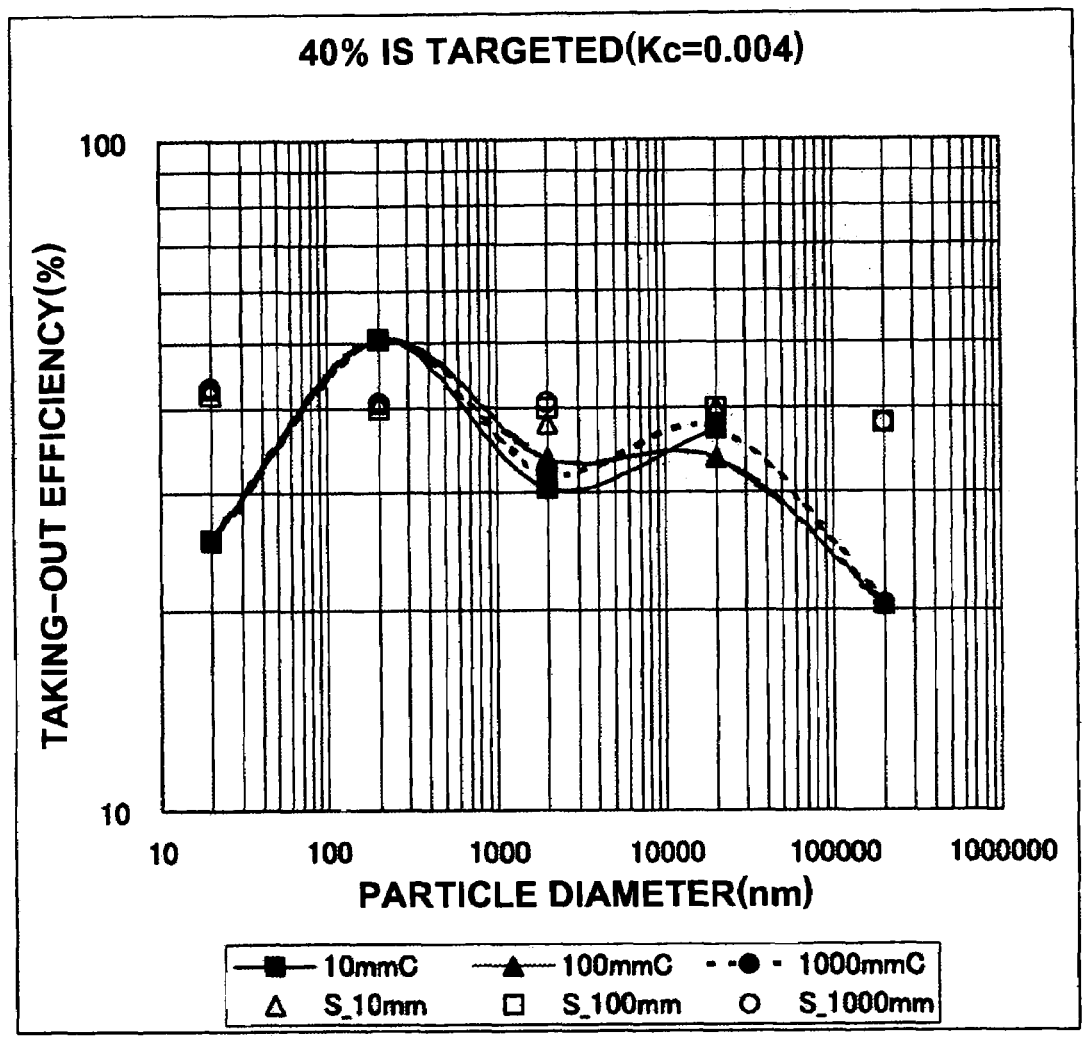
FIG. 7E is a graph showing the relationship between the particle diameter and the light taking-out efficiency while comparing results thereof obtained by the method of the present invention and the computer simulation with each other (light taking-out efficiency of 40% is targeted).
Figure 8A:
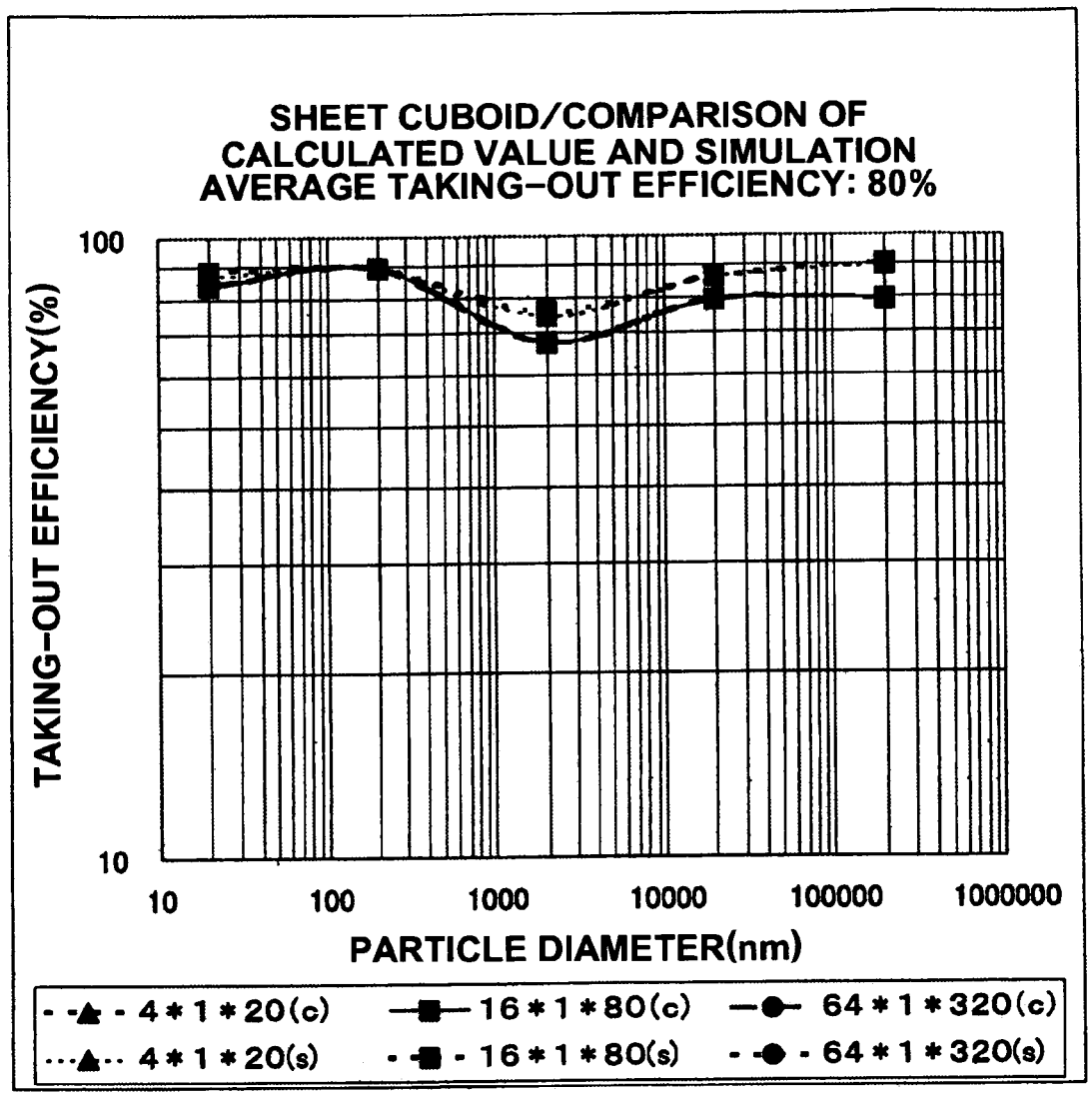
FIG. 8A is a graph showing the relationship between the particle diameter and the light taking-out efficiency in a sheet light guide while comparing results thereof obtained by calculation and simulation with each other (average light taking-out efficiency: 80%).
Figure 8B:
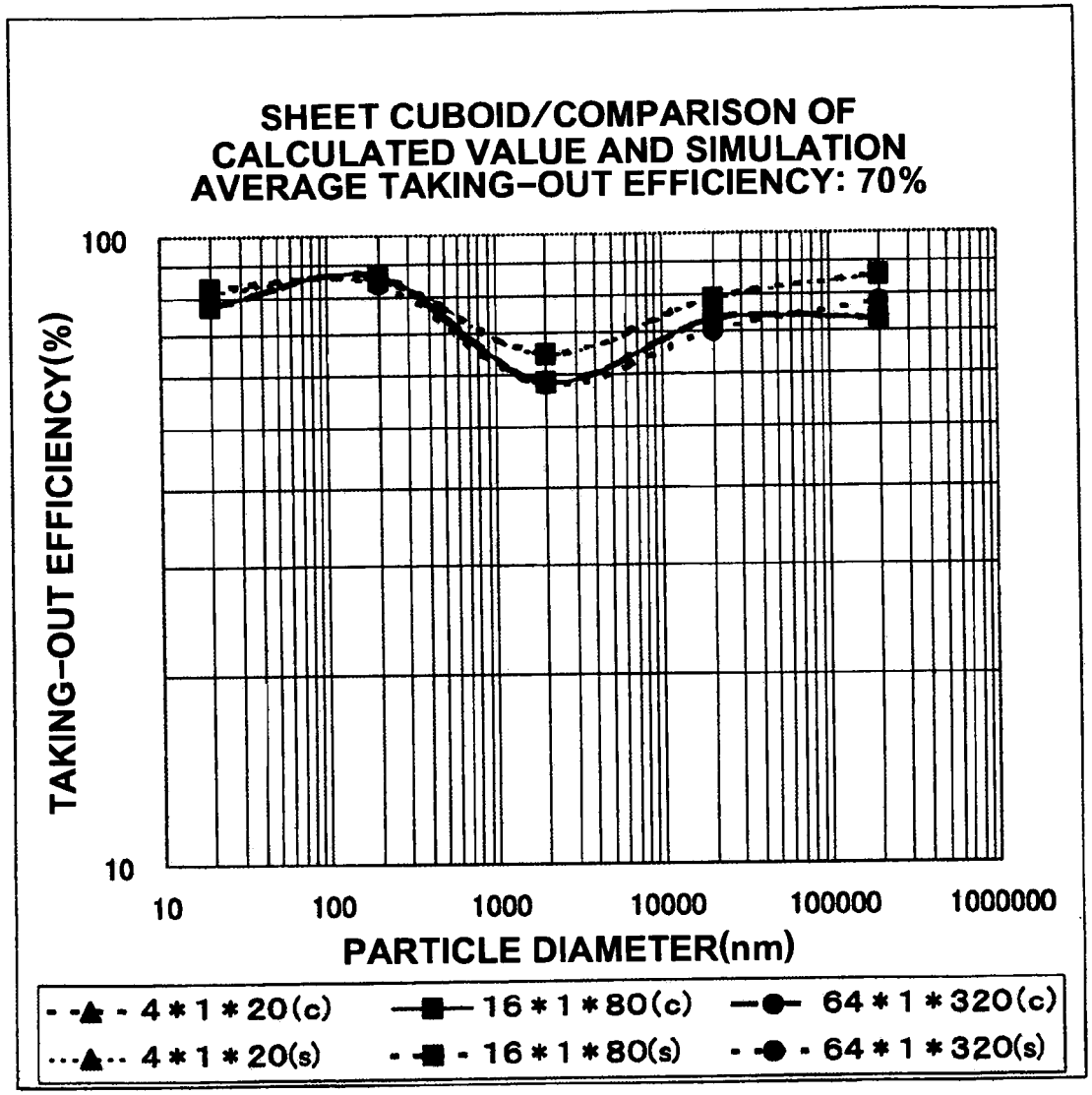
FIG. 8B is a graph showing the relationship between the particle diameter and the light taking-out efficiency in the sheet light guide while comparing results thereof obtained by the calculation and the simulation with each other (average light taking-out efficiency: 70%).
Figure 8C:
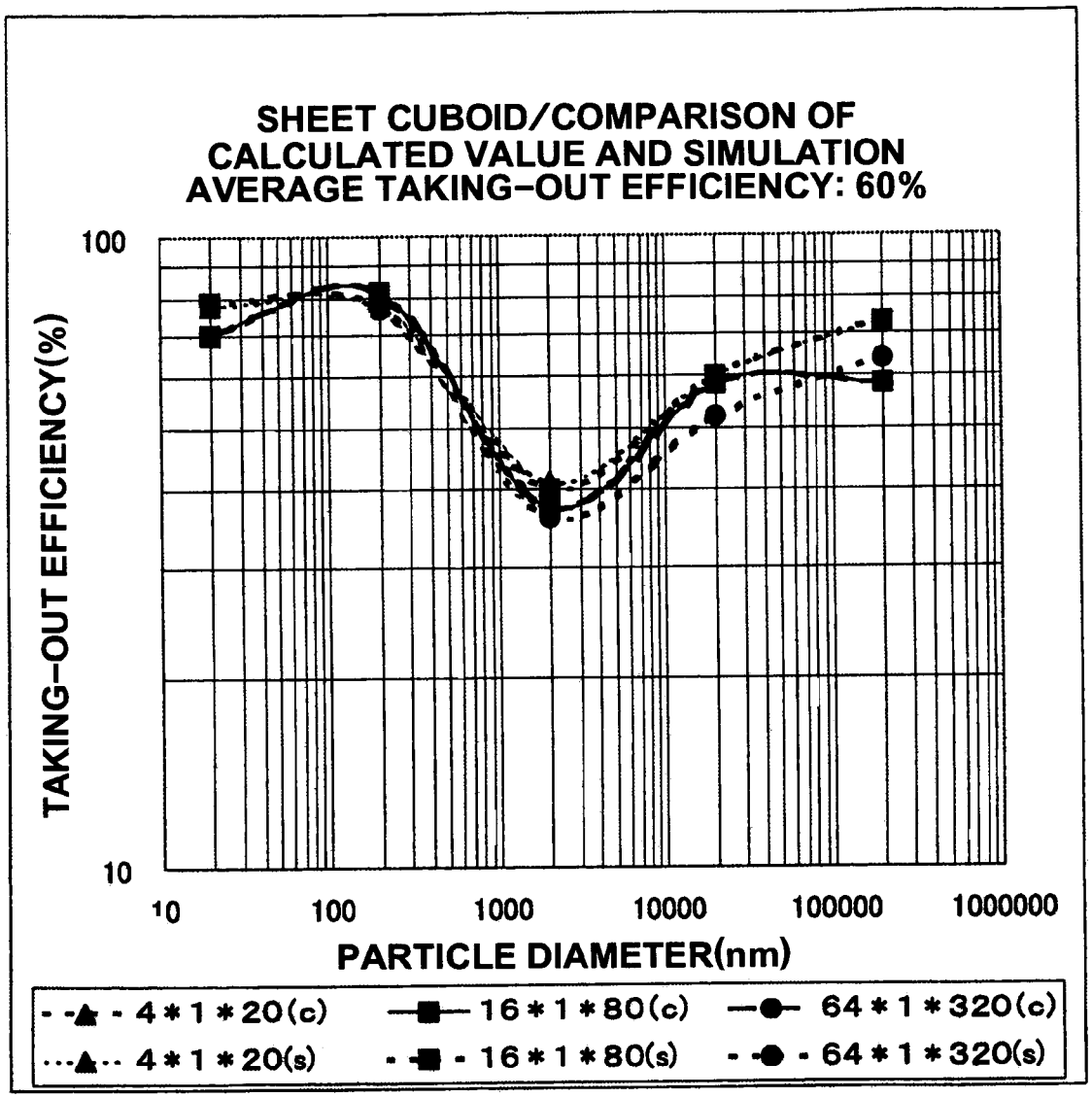
FIG. 8C is a graph showing the relationship between the particle diameter and the light taking-out efficiency in the sheet light guide while comparing results thereof obtained by the calculation and the simulation with each other (average light taking-out efficiency: 60%).
Figure 9A:
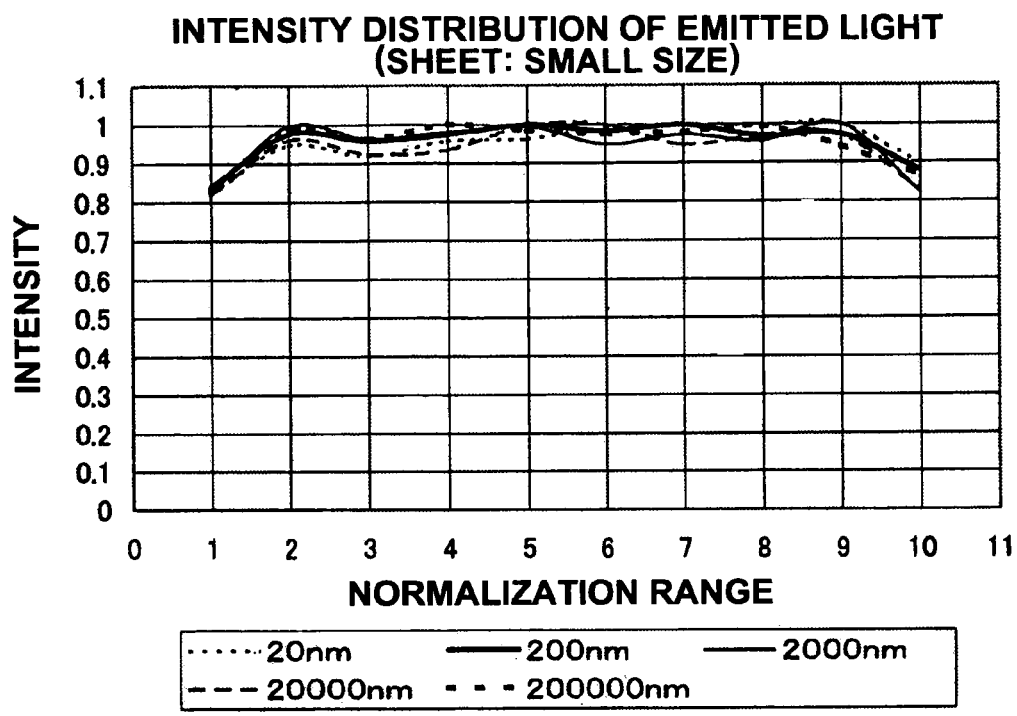
FIG. 9A is a graph showing distribution characteristics of emitted light in the sheet light guide when a sheet size is small.
Figure 9B:
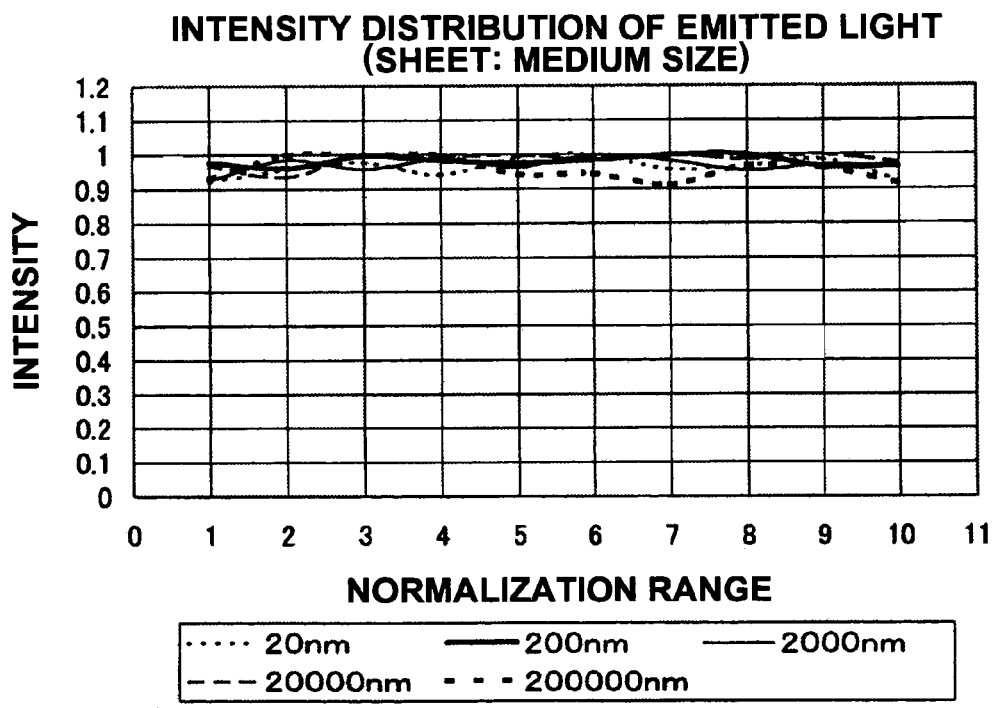
FIG. 9B is a graph showing the distribution characteristics of the emitted light in the sheet light guide when the sheet size is medium.
Figure 9C:
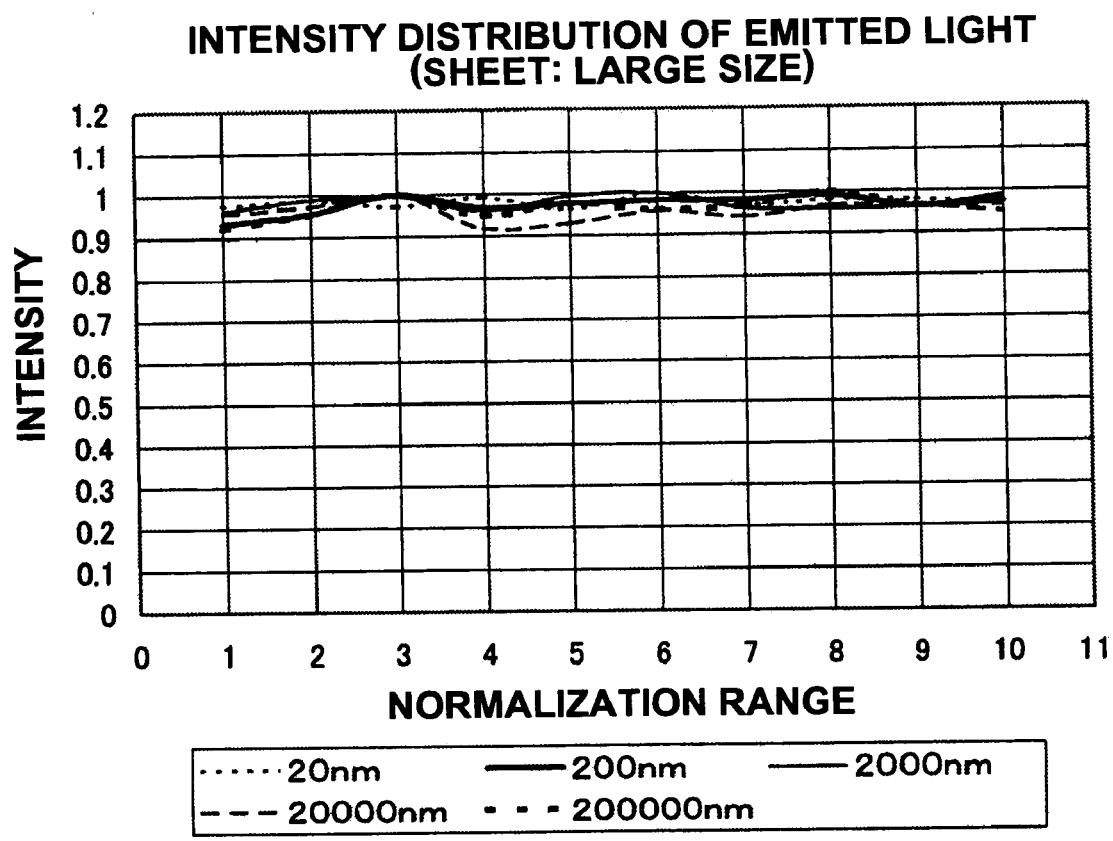
FIG. 9C is a graph showing the distribution characteristics of the emitted light in the sheet light guide when the sheet size is large.
Figure 10:
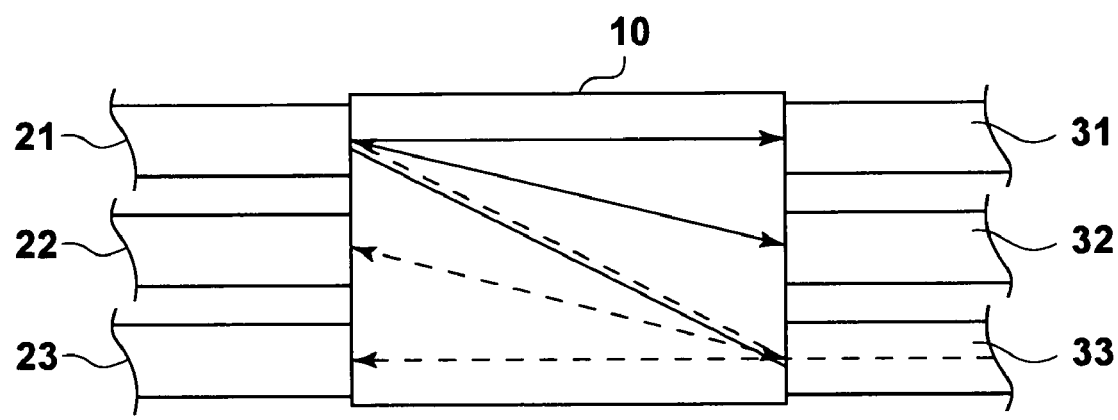
FIG. 10 is a plan view showing a schematic shape of the sheet light guide.
Figure 11:
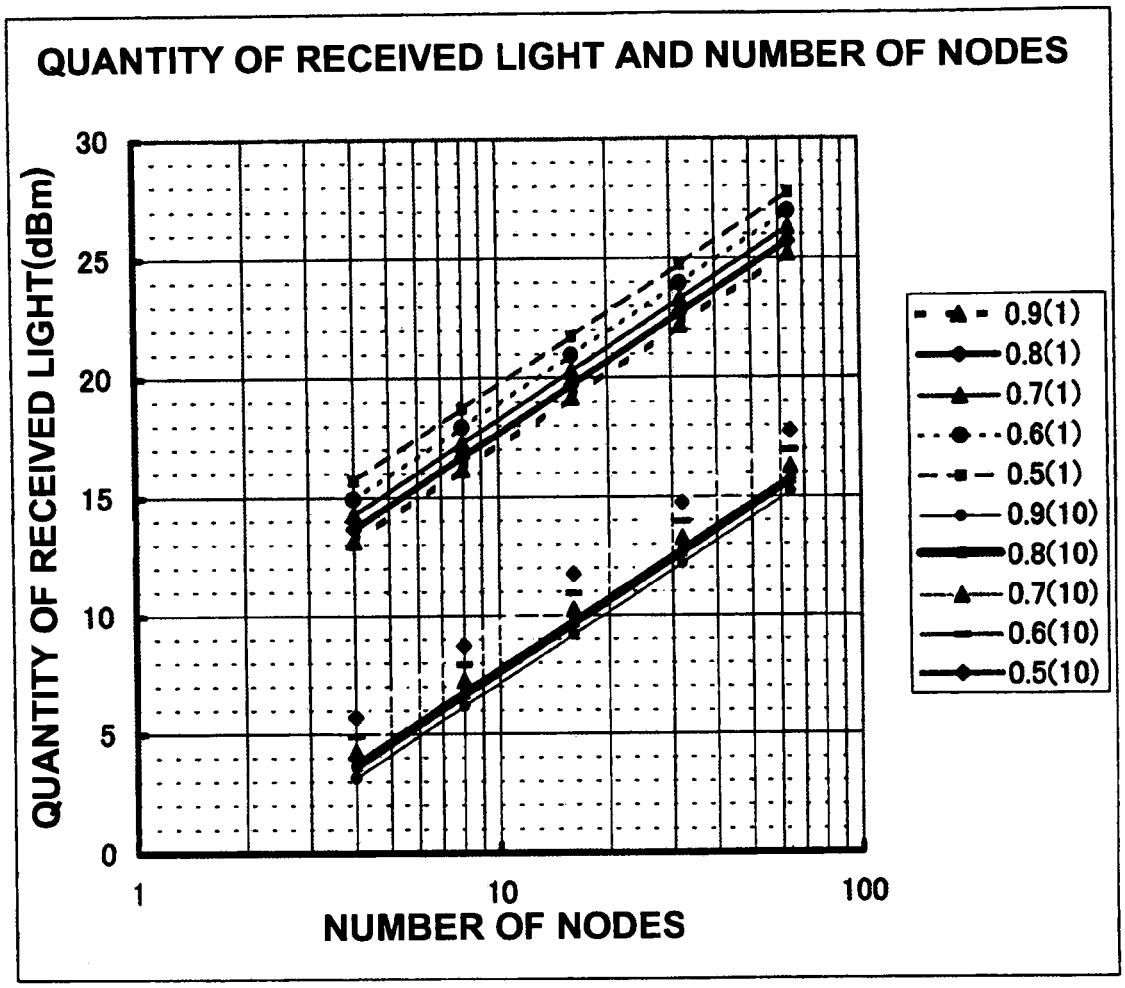
FIG. 11 is a graph showing the relationship between a quantity of received light and the number of nodes in a communication system using the sheet light guide.
Figure 12:
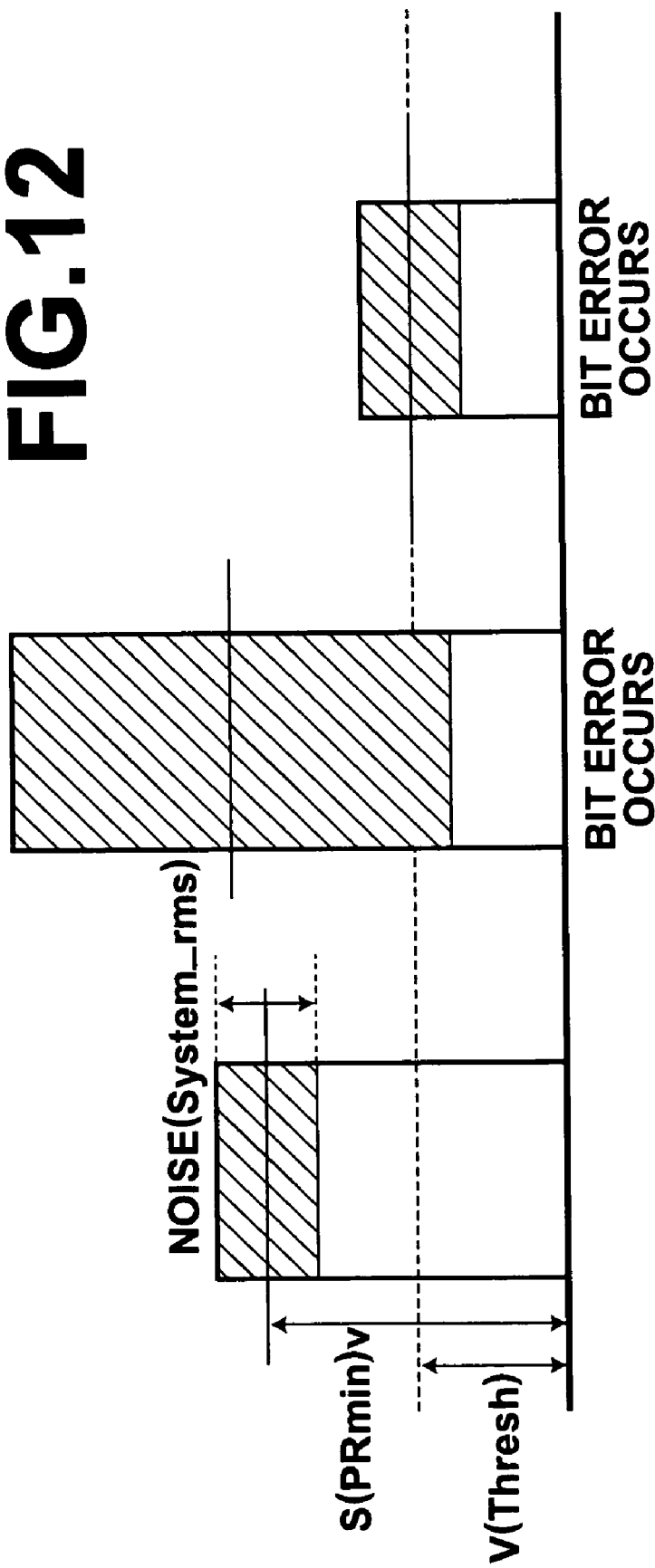
FIG. 12 is an explanatory view explaining an occurrence cause of a bit error.
Figure 13A:
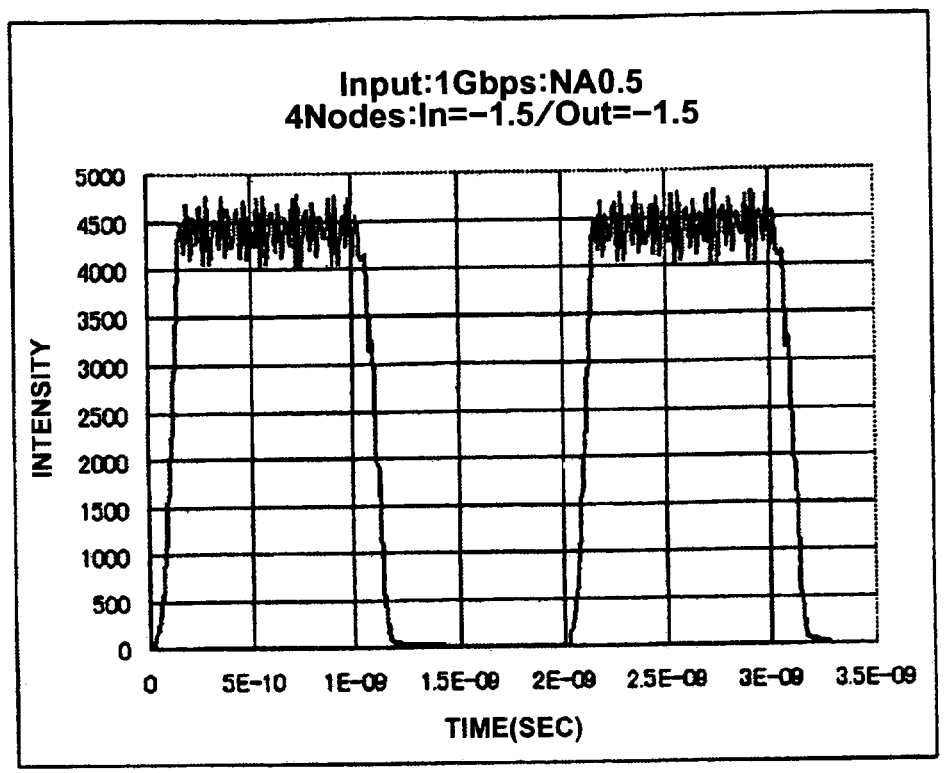
FIG. 13A is a graph showing an example of a waveform distortion of signal light in a communication system using the sheet light guide, of which number of nodes is four.
Figure 13B:
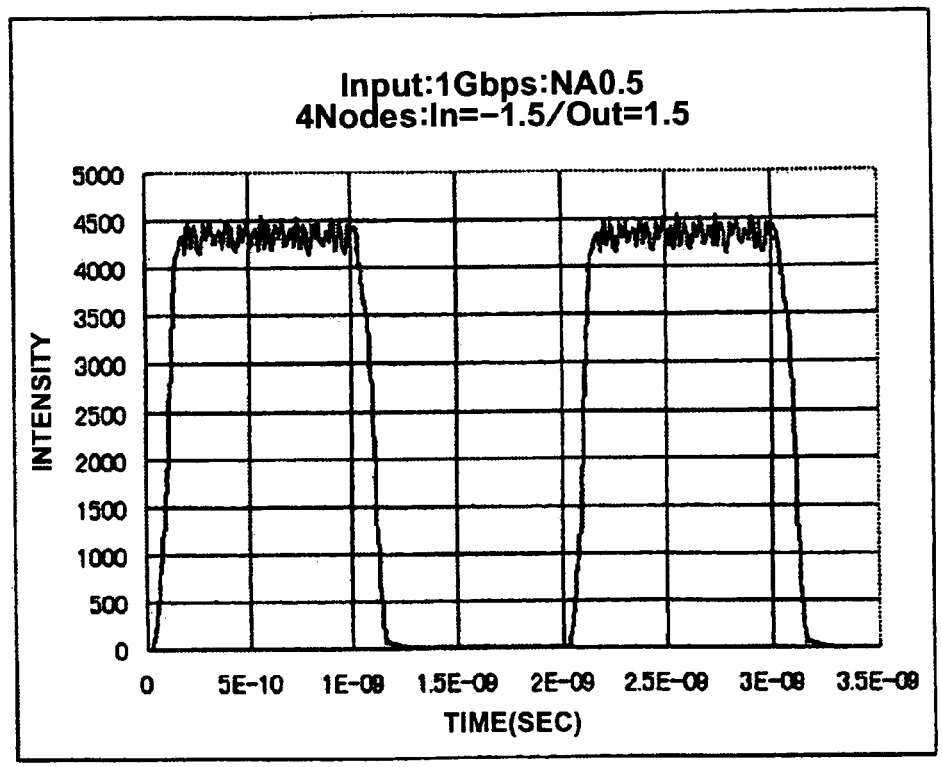
FIG. 13B is a graph showing another example of the waveform distortion of the signal light in the communication system using the sheet light guide, of which number of nodes is four.
Figure 14A:
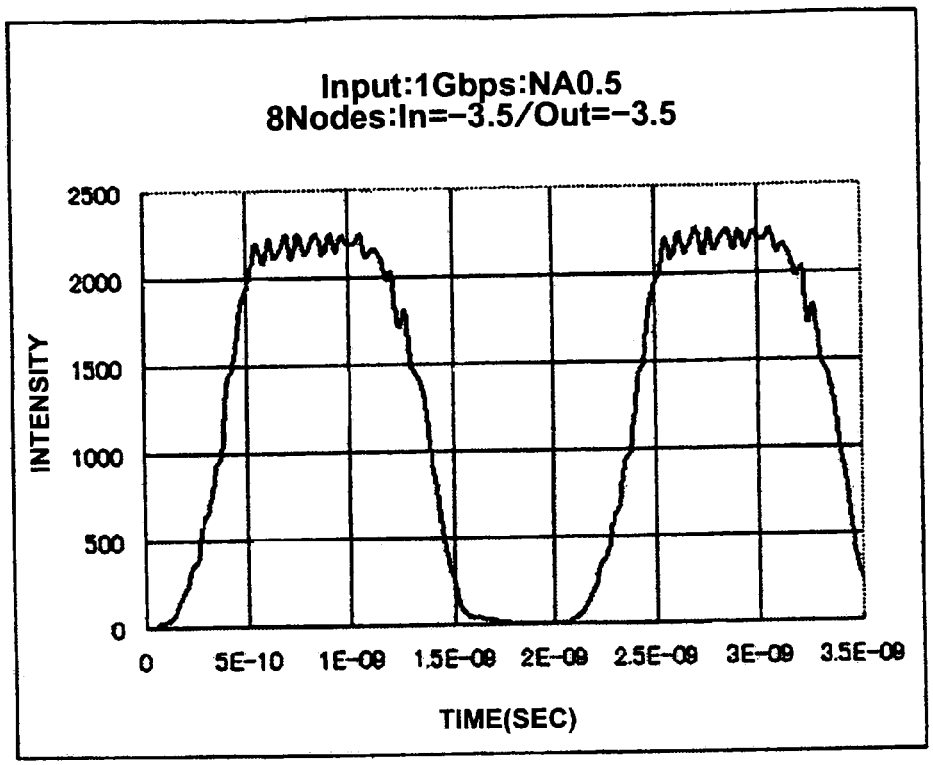
FIG. 14A is a graph showing an example of the waveform distortion of the signal light in a communication system using the sheet light guide, of which number of nodes is eight.
Figure 14B:
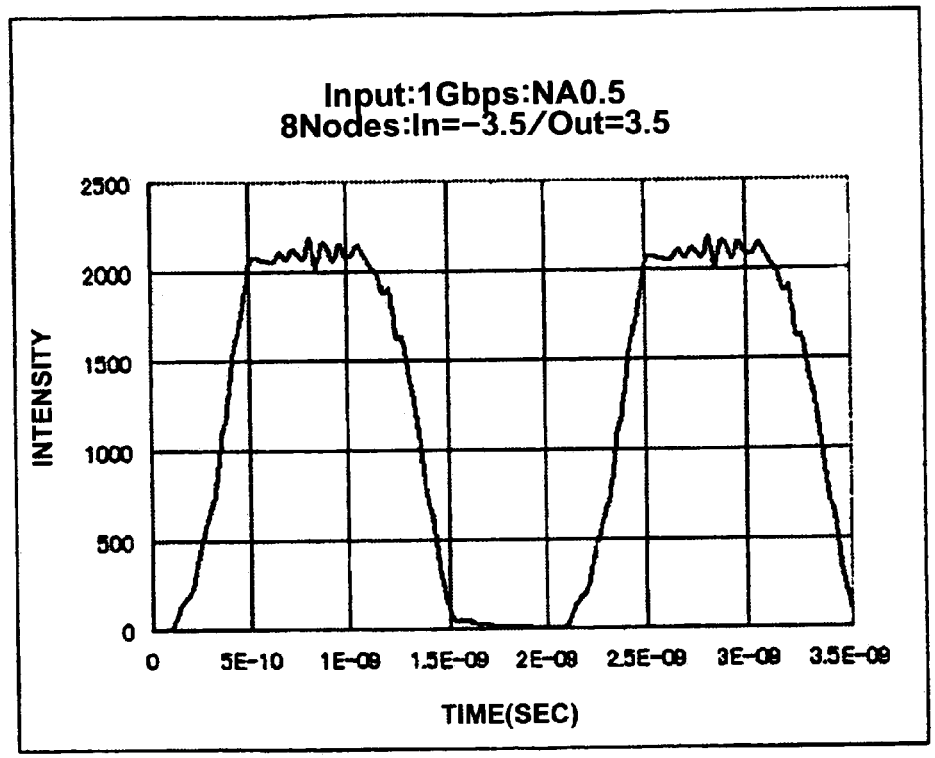
FIG. 14B is a graph showing another example of the waveform distortion of the signal light in the communication system using the sheet light guide, of which number of nodes is eight.
Figure 15A:
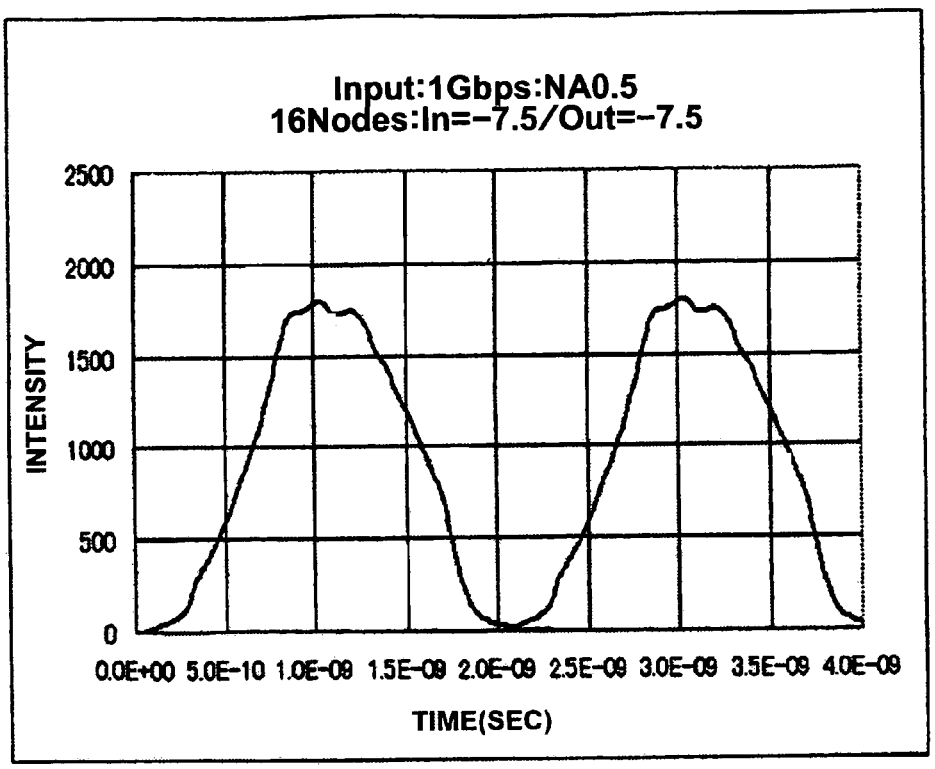
FIG. 15A is a graph showing an example of the waveform distortion of the signal light in a communication system using the sheet light guide, of which number of nodes is 16.
Figure 15B:
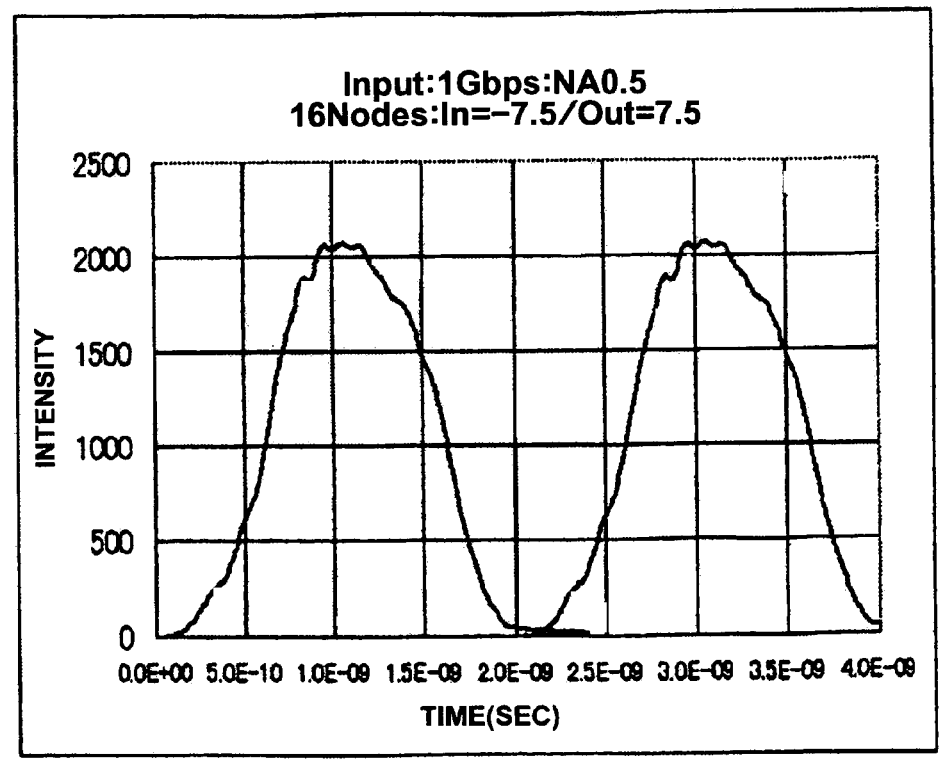
FIG. 15B is a graph showing another example of the waveform distortion of the signal light in the communication system using the sheet light guide, of which number of nodes is 16.
Figure 16:
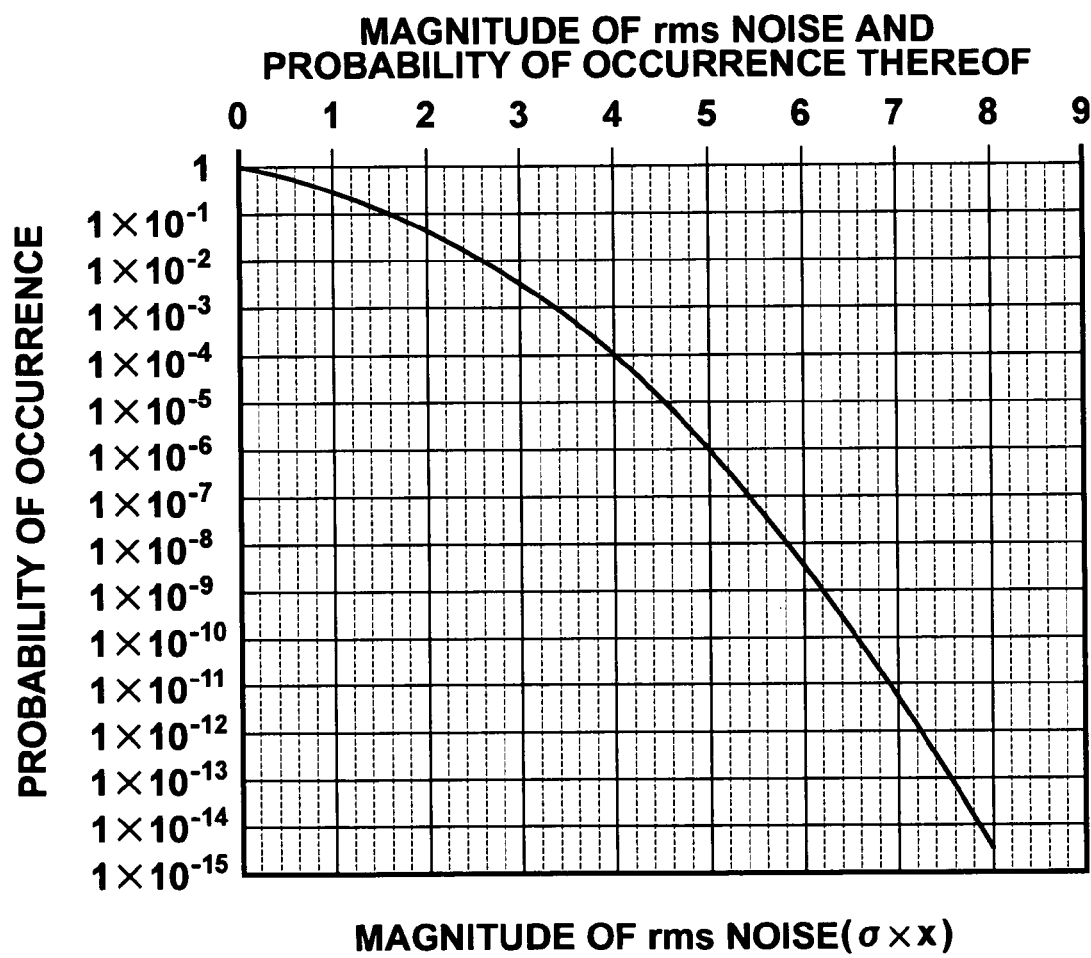
FIG. 16 is a graph showing the relationship between a magnitude of root mean square (rms) noise and a probability of occurrence thereof.
Figure 17:
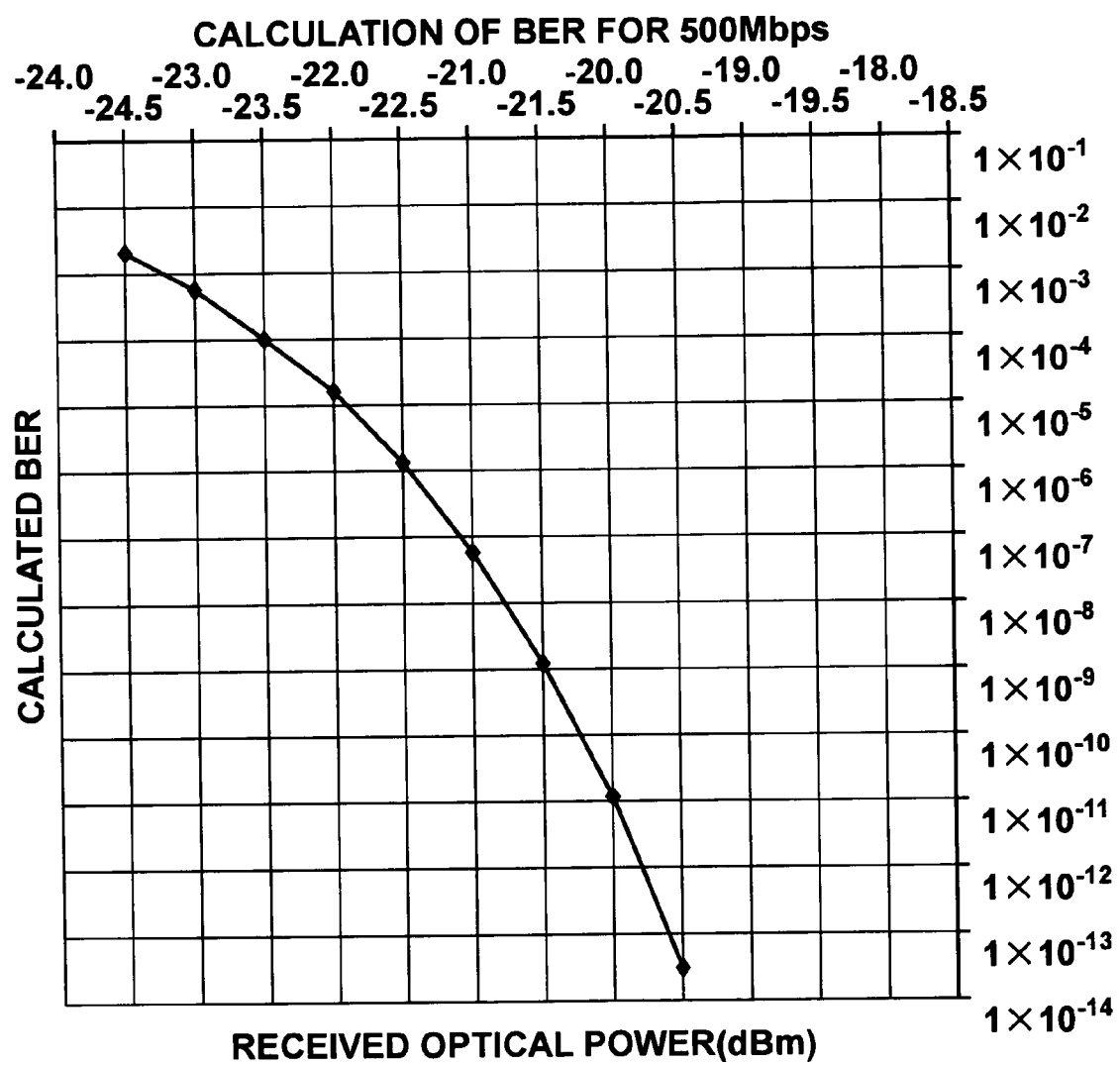
FIG. 17 is a graph showing the relationship between a Bit-Error-Rate (BER) and the quantity of received light.

Embodiments of the present invention will be hereinafter described in detail with reference to the accompanying drawings.

FIG. 18 shows a plan view of the communication system using the sheet light guide according to an embodiment of the present invention. As shown in the drawing thereof, this system is of a four-node type formed by coupling four optical fibers 21, 22, 23 and 24, for example, to one of two incident/emitting end surfaces 100a of one sheet light guide 100 and coupling four optical fibers 31, 32, 33 and 34 to the other end surface in a similar manner. The sheet light guide 100 is one formed to have a thickness of 1 mm, a width of 4 mm, and a length of 30 mm.

As described above, the sheet light guide 100 is formed by containing the light-scattering particles in the optical medium such as, for example, polymethylmethacrylate (PMMA). Moreover, the sheet light guide 100 is one which propagates the light incident from the one end surface to the other end surface side while scattering the light by the particles.

For example, signal light emitted from a light emitter (not shown) coupled to one of the optical fibers 21 to 24 on the left side of the drawing propagates through the optical fiber concerned and the sheet light guide 100, subsequently propagates through the optical fibers 31 to 34, and received in parallel, for example, by a photo detector (not shown) coupled to three of the optical fibers 31 to 34. To the remaining one of the optical fibers 31 to 34, a light emitter similar to the above-described one is coupled, thus enabling the two-way communication. In this embodiment, the two-way communication is enabled in such a manner, and accordingly, both of the two incident/emitting end surfaces 100a of the sheet light guide 100 function as an end surface of the light incident side and an end surface of the light emitting side.

FIG. 19A shows a front shape of each incident/emitting end surface 100a, and moreover, FIG. 19B shows an arrangement of the four optical fibers 21, 22, 23 and 24 on the incident/emitting end surface 100a. As shown in the drawing thereof, a height of the incident/emitting end surface 100a of the sheet light guide 100 is set at a value substantially equal to the outer diameter of each of the optical fibers 21 to 24. Moreover, both left and right side end portions of the incident/emitting end surface 100a are set to have semicircular side edge shapes in such a manner that each of the shapes conforms to an outer edge shape of outer halves of the outermost optical fibers 21 and 24.

The incident/emitting end surfaces 100a of the sheet light guide 100 are formed into such shapes. Thus, leakage occurring when communication light is incident from the sheet light guide 100 onto the optical fibers 21 to 24 is reduced in comparison with the case where the incident/emitting end surfaces are formed into a general rectangular shape (shown with a two-dotted line in FIG. 19B), and coupling efficiency of both is enhanced. Thus, a communication system is realizable, in which light transmission efficiency from the sheet light guide 100 to the optical fibers 21 to 24 is high, high S/N can be ensured, and the Bit-Error-Rate (BER) is lower.

Note that, in terms of enhancing the above-described light coupling efficiency, it is also possible to adopt another shape of each incident/emitting end surface. FIG. 20A shows a shape of each incident/emitting end surface 110a of another sheet light guide 110, and FIG. 20B shows the arrangement of the four optical fibers 21, 22, 23 and 24 on the incident/emitting end surface 110a.

As shown in the drawings thereof, the incident/emitting end surface 110a of the sheet light guide 110 is formed into a shape, which is based on a shape obtained by projecting cross sections of the optical fibers 21 to 24 arrayed in a row, and in which each portion between two optical fibers is somewhat thickened. Specifically, this sheet light guide 110 is formed to have semicircular side edge shapes in such a manner that each of the shapes conforms to the outer edge shapes of the outer halves of the outermost optical fibers 21 and 24. Moreover, the sheet light guide 110 is formed to have upper and lower edge shapes, both edges being precut so that the shapes thereof substantially coincide with outer edge shapes of inner halves of two optical fibers adjacent to each other.

In this case also, where each incident/emitting end surface 110*a* of the sheet light guide 110 is formed into the shape as described above, the leakage occurring when communication light is incident from the sheet light guide 110 onto the optical fibers 21 to 24 is reduced in comparison with the case where the incident/emitting end surfaces are formed into the general rectangular shape (shown by a two-dotted line in FIG. 20B), and coupling efficiency of both is enhanced. Thus, the communication system is realizable, in which light transmission efficiency from the sheet light guide 110 to the optical fibers 21 to 24 is high, high S/N can be ensured, and the Bit-Error-Rate (BER) is lower.

It is desirable that the above-described sheet light guide 110 be created so as to have a cross-sectional shape similar to the shape of the incident/emitting end surface 110*a* over the entire length. However, besides the above, the sheet light guide 110 may also be formed into a shape, in which a usual rectangular cross-sectional shape is provided for a center portion in the length direction, and the center portion and the incident/emitting end surfaces 110*a* are continuous by a smooth curve. This feature can also be applied to the sheet light guide 100 mentioned above.

Moreover, in the case where one of two end surfaces of a sheet light guide is made as an incident-side end surface of the communication light and the other thereof is made as an emitting-side end surface of the communication light without enabling the two-way communication and the plurality of optical fibers are individually coupled to both of the end surfaces, it is satisfactory if only the latter end surface is made as one having the outer edge shape according to the present invention.

Note that the light coupling efficiency between each of the sheet light guides 100 and 110 and the optical fibers 21 to 24 in FIGS. 19 and 20 is shown below in comparison with the case where the incident/emitting end surfaces of the sheet light guide are formed into a normal rectangular shape (comparative example).

In any of the cases, the signal light propagated through the sheet light guide is coupled to the four optical fibers 21 to 24, and a ratio of an output coupled to one optical fiber in this case to the total output from the sheet light guide is defined as Output, and a degree of attenuation in the one optical fiber is defined as dB=−10×log(Output). If the coupling is ideal, the Output is equal to 0.25, and the degree of attenuation in this case becomes 6 dB. As opposed to this, the degrees of attenuation in the comparative examples, the sheet light guide 100 and the sheet light guide 110 became 7.0 to 7.2 dB, 6.6 to 6.8 dB, and 6.6 dB or less. Thus, it was proven that the sheet light guides 100 and 110 are higher in coupling efficiency in comparison with the comparative example.

Moreover, the sheet light guide 100 and the sheet light guide 110 which have the incident/emitting end surface shapes as described above can be fabricated by, for example, injection molding and precise cutting.

What is claimed is:

1. A sheet light guide, comprising:

a sheet optical medium comprising light scattering particles, the sheet optical medium configured to propagate signal light incident on a first end surface of the sheet optical medium to a second end surface of the sheet optical medium while scattering the signal light with the particles, and the sheet optical medium configured to couple a plurality of optical fibers to the second end surface, wherein the second end surface, which emits the signal light, has an outer edge shape in which at least a portion of the outer edge shape substantially coincides with an outer edge shape of the plurality of optical fibers, wherein the sheet light guide is formed by mixing particles into an optical medium, the particles being mixed such that a gradient is formed with respect to particle density.

2. A communication system, comprising:

a sheet light guide comprising a sheet optical medium comprising light scattering particles, the sheet optical medium configured to propagate signal light incident on a first end surface of the sheet optical medium to a second end surface of the sheet optical medium while scattering the signal light with the particles; and a plurality of optical fibers coupled to the second end surface of the sheet optical medium of the sheet light guide, wherein the second end surface, which emits the signal light, has an outer edge shape in which at least a portion of the outer edge shape substantially coincides with an outer edge shape of the plurality of optical fibers, which are arranged in parallel, and wherein, when a scattering cross section of the particles is $\Phi$, a length of the sheet optical medium in the light propagation direction is $L_G$, a particle density is $N_P$, and a correction coefficient is $K_C$, the value of $\Phi \cdot NP \cdot L_G \cdot K_C$ is 0.9 or less.

3. A communication system according to claim 2, wherein, when rms noise of the system is Noise(System_rms), an acceptable bit error rate is BER(accept), and a probability of occurrence of the Noise(System_rms) is Pr(Noise(System_rms)), the communication system is configured to establish the following relationship:

$$Pr(\text{Noise(System\_rms)} \cdot Q) \leq \text{BER(accept)}$$

where Q is a proportionality constant.

4. A communication system according to claim 3, wherein, when light taking-out efficiency Bout in the sheet light guide is represented as:

$$Eout = \exp\{-(\Phi \cdot Np \cdot L_G \cdot K_C)\} \cdot K_L$$

where $K_L$ is a loss coefficient obtained by synthesizing internal transmittivity and the like of the sheet light guide, when a minimum quantity of received light $P(\text{Reciver\_min})_{dBm}$ is represented as:

$$P(\text{Receiver\_min})_{dBm} = -10 \text{Log}\{Pin \cdot Eout \cdot (NPi(\min)/\Sigma NPi) \cdot \pi/4\} \cdot K_T$$

where Pin is a quantity of incident light, NPi(min) is a quantity of light of a segment in which the quantity of light becomes minimum, $\Sigma NPi$ is a sum of quantities of light of respective segments, and $K_T$ is a coupling loss of a light emitter, the optical fibers and a photodetector, and when a signal voltage determined from the minimum quantity of received light $P(\text{Receiver\_min})_{dBm}$ and a load resistor of the photodetector is S(PRmin)v, rms noise of the system is Noise(System_rms), and an arbitrary value in binarization is V(Thresh), the communication system is configured to establish the following relationship:

$$\{S(PR\min)v - V(\text{Thresh})\} > \text{Noise(System\_rms)} \cdot Q.$$

5. A communication system using the sheet light guide according to claim 3, wherein the sheet optical medium is formed such that sin θs>1, where sin θs is a refraction angle of light in a sheet light guide configured to have the following properties:
   light incident on the sheet light guide repeatedly reflects on surfaces other than incident/emitting end surfaces obeying Snell's Law,
   a refractive index of a medium surrounding the sheet optical medium is Ns,
   a refractive index of the sheet optical medium is Nm,
   an incident angle of the incident light is θm,
   Nm·sin θm=Ns·sin θs when the light scattering particles are not contained in the sheet optical medium.

6. A communication system according to claim 3, wherein the sheet optical medium is formed such that sin θs>1, where sin θs is a refraction angle of light in a sheet light guide configured to have the following properties:
   a light beam emitted from at least one emitting end surface obeys Snell's Law in reflection/refraction thereof on the emitting end surface,
   a refractive index of a medium surrounding the sheet optical medium is Ns,
   a refractive index of the sheet optical medium is Nm,
   an incident angle of the incident light is θm,
   Nm·sin θm=Ns·sin θs when the light scattering particles are not contained in the sheet optical medium.

7. A communication system according to claim 2, wherein, when light taking-out efficiency Eout in the sheet light guide is represented as:

$$E\text{out}=\exp\{-(\Phi \cdot Np \cdot L_G \cdot K_C)\} \cdot K_L$$

where $K_L$ is a loss coefficient obtained by synthesizing internal transmittivity and the like of the sheet light guide,
when a minimum quantity of received light $P(\text{Reciver\_min})_{dBm}$ is represented as:

$$P(\text{Receiver\_min})_{dBm}=-10\text{Log}\{P\text{in} \cdot E\text{out} \cdot (NPi(\text{min})/\Sigma NPi) \cdot \pi/4\} \cdot K_T$$

where Pin is a quantity of incident light, NPi(min) is a quantity of light of a segment in which the quantity of light becomes minimum, ΣNPi is a sum of quantities of light of respective segments, and $K_T$ is a coupling loss of a light emitter, the optical fibers and a photodetector, and
when a signal voltage determined from the minimum quantity of received light $P(\text{Receiver\_min})_{dBm}$ and a load resistor of the photodetector is S(PRmin)v, rms noise of the system is Noise(System_rms), and an arbitrary value in binarization is V(Thresh), the communication system is configured to establish the following relationship:

$$\{S(PR\text{ min})v-V(\text{Thresh})\}>\text{Noise}(\text{System\_rms}) \cdot Q.$$

8. A communication system according to claim 2, wherein the sheet optical medium is formed such that sin θs>1, where sines is a refraction angle of light in a sheet light guide configured to have the following properties:
   light incident on the sheet light guide repeatedly reflects on surfaces other than incident/emitting end surfaces obeying Snell's Law,
   a refractive index of a medium surrounding the sheet optical medium is Ns,
   a refractive index of the sheet optical medium is Nm,
   an incident angle of the incident light is θm,
   Nm·sin θm=Ns·sin θs when the light scattering particles are not contained in the sheet optical medium.

9. A communication system according to claim 2, wherein the sheet optical medium is formed such that sin θs>1, where sin θs is a refraction angle of light in a sheet light guide configured to have the following properties:
   a light beam emitted from at least one emitting end surface obeys Snell's Law in reflection/refraction thereof on the emitting end surface,
   a refractive index of a medium surrounding the sheet optical medium is Ns,
   a refractive index of the sheet optical medium is Nm,
   an incident angle of the incident light is θm,
   Nm·sin θm=Ns·sin θs when the light scattering particles are not contained in the sheet optical medium.

* * * * *